US012739158B2

(12) United States Patent
Huang et al.

(10) Patent No.: US 12,739,158 B2
(45) **Date of Patent: *Sep. 15, 2026**

(54) COMMUNICATION APPARATUS AND COMMUNICATION METHOD FOR CHANNEL ESTIMATION

(71) Applicant: Panasonic Intellectual Property Corporation of America, Torrance, CA (US)

(72) Inventors: Lei Huang, Singapore (SG); Yoshio Urabe, Nara (JP); Yanyi Ding, Singapore (SG); Rojan Chitrakar, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 18/918,934

(22) Filed: Oct. 17, 2024

(65) Prior Publication Data

US 2025/0039023 A1 Jan. 30, 2025

Related U.S. Application Data

(63) Continuation of application No. 17/768,446, filed as application No. PCT/SG2020/050450 on Aug. 4, 2020, now Pat. No. 12,155,513.

(30) Foreign Application Priority Data

Oct. 31, 2019 (SG) .......................... 10201910164V

(51) Int. Cl.
*H04L 27/28* (2006.01)
*H04B 7/0452* (2017.01)
(Continued)

(52) U.S. Cl.
CPC ....... *H04L 27/2602* (2013.01); *H04B 7/0452* (2013.01); *H04L 25/0204* (2013.01)

(58) Field of Classification Search
CPC . H04L 25/0204; H04L 5/0023; H04L 1/0618; H04L 27/2675; H04B 7/0425;
(Continued)

(56) References Cited

U.S. PATENT DOCUMENTS 12,155,513 B2 * 11/2024 Huang ................ H04L 27/2613
2019/0115970 A1 4/2019 Vermani et al.
(Continued)

FOREIGN PATENT DOCUMENTS

CN 109412772 A 3/2019
WO WO 2019074927 A1 4/2019

OTHER PUBLICATIONS

Indian Examination Report dated Feb. 19, 2024, for the corresponding Indian Patent Application No. 202227021820, 7 pages.
(Continued)

*Primary Examiner* — Khai Tran
(74) *Attorney, Agent, or Firm* — Seed Intellectual Property Law Group LLP

(57) ABSTRACT

A communication apparatus includes circuitry and a transmitter. The circuitry generates a signal including one or more non-legacy long training field (LTF) symbols. Each of the one or more non-legacy LTF symbols has a plurality of data tones and a plurality of pilot tones. The circuitry maps a non-legacy LTF sequence to the plurality of data tones and the plurality of pilot tones, and groups the plurality of data tones with nonzero non-legacy LTF sequence values into a first tone group and a second tone group. The signal includes information on a number $N_{STS}$ of space-time streams, wherein a total number of the one or more non-legacy LTF symbols is $\lceil N_{STS}/2 \rceil$ when 10 the $N_{STS}$ is 2, 3, 4, 7, 8, 11, 12,
(Continued)

15 or 16; and $\lceil N_{STS}/2 \rceil+1$ when the $N_{STS}$ is 5, 6, 9, 10, 13 or 14. The transmitter, in operation, transmits the generated signal.

17 Claims, 15 Drawing Sheets

(51) Int. Cl.
*H04L 25/02* (2006.01)
*H04L 27/26* (2006.01)

(58) Field of Classification Search
CPC . H04B 7/0413; H04W 84/12; H04W 72/0453
USPC ................................ 375/260, 262, 267, 299
See application file for complete search history.

(56) References Cited

U.S. PATENT DOCUMENTS

2019/0261369 A1* 8/2019 Verma .................. H04L 5/0048
2020/0145157 A1 5/2020 Suh et al.
2020/0288393 A1 9/2020 Zhang et al.
2021/0144558 A1* 5/2021 Parthasarathy ....... H04L 5/0073
2022/0140942 A1 5/2022 Vermani et al.
2025/0211473 A1* 6/2025 Yang .................. H04L 27/2628

OTHER PUBLICATIONS

International Search Report, mailed Nov. 9, 2020, for International Application No. PCT/SG2020/050450, 3 pages.
Park et al., LG Electronics, "Overview of PHY Features for EHT," IEEE 802.11-18/1967r1, Jan. 14, 2019, 22 pages.

* cited by examiner

STA
304
STA
306
STA
308
Trigger information
Trigger information
Trigger information
309
310
311
312
313
314
AP
302
300

L-STF
L-LTF
L-SIG
FIF
EHT-SIG-A
EHT-STF
EHT-LTF
Data
PE
350
354
352

| $N_{STS}$ | $N_{EHT-LTF}$ |
|---|---|
| 2 | 1 |
| 3 | 2 |
| 4 | 2 |
| 5 | 4 |
| 6 | 4 |
| 7 | 4 |
| 8 | 4 |
| 9 | 6 |
| 10 | 6 |
| 11 | 6 |
| 12 | 6 |
| 13 | 8 |
| 14 | 8 |
| 15 | 8 |
| 16 | 8 |

| | EHT-LTF SYM 1 | EHT-LTF SYM 2 | EHT-LTF SYM 3 | EHT-LTF SYM 4 | EHT-LTF SYM 5 | EHT-LTF SYM 6 |
|---|---|---|---|---|---|---|
| Group 2 data tones | STS 6,7,8, 9,10 | STS 6,7,8, 9,10 | STS 6,7,8, 9,10 | STS 6,7,8, 9,10 | STS 6,7,8, 9,10 | STS 6,7,8, 9,10 |
| Group 1 data tones | STS 1,2,3, 4,5 | STS 1,2,3, 4,5 | STS 1,2,3, 4,5 | STS 1,2,3, 4,5 | STS 1,2,3, 4,5 | STS 1,2,3, 4,5 |

| | EHT-LTF SYM 1 | EHT-LTF SYM 2 | EHT-LTF SYM 3 | EHT-LTF SYM 4 | EHT-LTF SYM 5 | EHT-LTF SYM 6 |
|---|---|---|---|---|---|---|
| Group 2 data tones | STS 2,4,6, 8,10 | STS 2,4,6, 8,10 | STS 2,4,6, 8,10 | STS 2,4,6, 8,10 | STS 2,4,6, 8,10 | STS 2,4,6, 8,10 |
| Group 1 data tones | STS 1,3,5, 7,9 | STS 1,3,5, 7,9 | STS 1,3,5, 7,9 | STS 1,3,5, 7,9 | STS 1,3,5, 7,9 | STS 1,3,5, 7,9 |

| $N_{STS}$ | $N_{EHT-LTF}$ |
|---|---|
| 2 | 2 |
| 3 | 4 |
| 4 | 4 |
| 5 | 6 |
| 6 | 6 |
| 7 | 8 |
| 8 | 8 |
| 9 | 6 |
| 10 | 6 |
| 11 | 6 |
| 12 | 6 |
| 13 | 8 |
| 14 | 8 |
| 15 | 8 |
| 16 | 8 |

| $N_{STS}$ | $N_{EHT-LTF}$ |
|---|---|
| 2 | 2 |
| 3 | 4 |
| 4 | 4 |
| 5 | 6 |
| 6 | 6 |
| 7 | 8 |
| 8 | 8 |
| 9 | 8 |
| 10 | 8 |
| 11 | 8 |
| 12 | 8 |
| 13 | 8 |
| 14 | 8 |
| 15 | 8 |
| 16 | 8 |

COMMUNICATION APPARATUS AND COMMUNICATION METHOD FOR CHANNEL ESTIMATION

TECHNICAL FIELD

The present disclosure relates to communication apparatuses and methods for channel estimation, and more particularly to communication apparatuses and methods for channel estimation in multiple-input multiple-output (MIMO) wireless networks.

BACKGROUND

In the standardization of next generation wireless local area network (WLAN), a new radio access technology having backward compatibilities with IEEE 802.11a/b/g/n/ac/ax technologies has been discussed in the IEEE 802.11 Working Group and is named Extremely High Throughput (EHT) WLAN.

In EHT WLAN, in order to provide significant peak throughput and capacity increase over 802.11ax high efficiency (HE) WLAN, it is desired to increase the maximum number of space-time streams from 8 to 16, especially for multiuser multiple-input multiple-output (MU-MIMO) transmissions.

However, there has been no discussion on communication apparatuses and methods for MIMO channel estimation in the context of EHT WLAN.

There is thus a need for communication apparatuses and methods that provide feasible technical solutions for MIMO channel estimation in the context of EHT WLAN. Furthermore, other desirable features and characteristics will become apparent from the subsequent detailed description and the appended claims, taken in conjunction with the accompanying drawings and this background of the disclosure.

SUMMARY

One non-limiting and exemplary embodiment facilitates providing apparatuses for MIMO channel estimation in context of EHT WLAN.

According to a first aspect of the present disclosure, there is provided a communication apparatus comprising: circuitry which, in operation, generates a signal comprising one or more non-legacy long training field (LTF) symbols, each of the one or more non-legacy LTF symbols comprising a plurality of data tones and a plurality of pilot tones, maps a non-legacy LTF sequence to the plurality of data tones and the plurality of pilot tones, and groups the plurality of data tones with nonzero non-legacy LTF sequence values into a first tone group and a second tone group; and a transmitter which, in operation, transmits the generated signal.

According to a second aspect of the present disclosure, there is provided a communication method comprising: generating a signal comprising one or more non-legacy long training field (LTF) symbols, each of the one or more non-legacy LTF symbols comprising a plurality of data tones and a plurality of pilot tones; mapping a non-legacy LTF sequence to the plurality of data tones and the plurality of pilot tones; grouping the plurality of data tones with nonzero non-legacy LTF sequence values equally into a first tone group and a second tone group; and transmitting the generated signal.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

Embodiments of the disclosure will be better understood and readily apparent to one of ordinary skilled in the art from the following written description, by way of example only, and in conjunction with the drawings, in which:

FIGS. 6A and 6B show schematic examples of how space-time streams (STSs) and data tones may be grouped in accordance with the first embodiment of the present disclosure.

FIG. 13 shows a table displaying values of $N_{STS}$ with its corresponding $N_{EHT\text{-}LTF}$ values according to a fourth embodiment of the present disclosure.

Figures 1A, 1B:
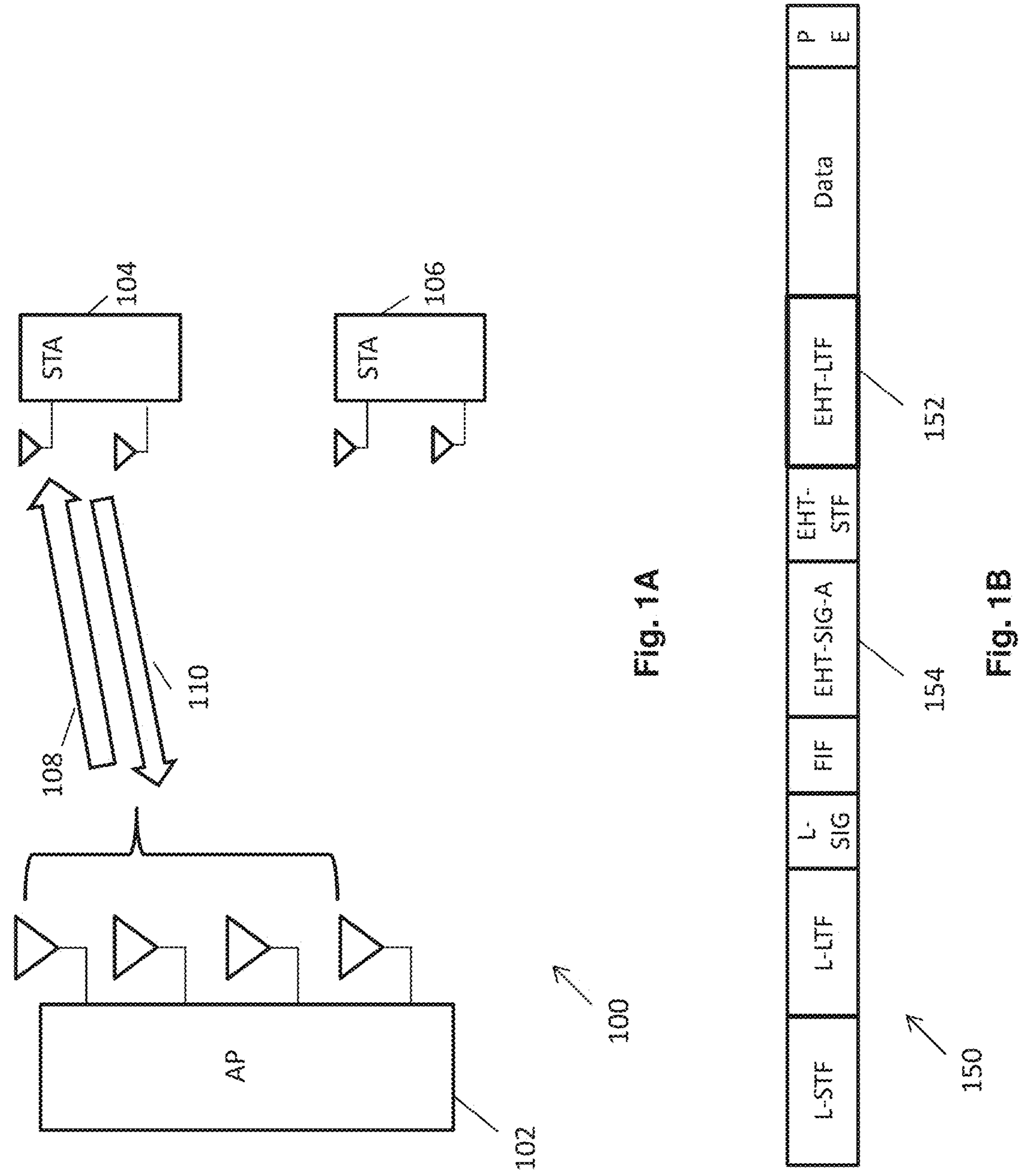
FIG. 1A depicts a schematic diagram of uplink and downlink single-user (SU) multiple input multiple output (MIMO) communications between an access point (AP) and a station (STA) in a MIMO wireless network.
FIG. 1B shows a format of a physical layer protocol data unit (PPDU) used for SU communications according to various embodiments of the present disclosure.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DETAILED DESCRIPTION

Some embodiments of the present disclosure will be described, by way of example only, with reference to the drawings. Like reference numerals and characters in the drawings refer to like elements or equivalents.

In the following paragraphs, certain exemplifying embodiments are explained with reference to an access point (AP) and a station (STA) for channel estimation, especially in a multiple-input multiple-output (MIMO) wireless network.

In the context of IEEE 802.11 (Wi-Fi) technologies, a station, which is interchangeably referred to as a STA, is a communication apparatus that has the capability to use the 802.11 protocol. Based on the IEEE 802.11-2007 definition, a STA can be any device that contains an IEEE 802.11-conformant media access control (MAC) and physical layer (PHY) interface to the wireless medium (WM).

For example, a STA may be a laptop, a desktop personal computer (PC), a personal digital assistant (PDA), an access point or a Wi-Fi phone in a wireless local area network (WLAN) environment. The STA may be fixed or mobile. In the WLAN environment, the terms "STA", "wireless client", "user", "user device", and "node" are often used interchangeably.

Likewise, an AP, which may be interchangeably referred to as a wireless access point (WAP) in the context of IEEE 802.11 (Wi-Fi) technologies, is a communication apparatus that allows STAs in a WLAN to connect to a wired network. The AP usually connects to a router (via a wired network) as a standalone device, but it can also be an integral component of the router itself.

As mentioned above, a STA in a WLAN may work as an AP at a different occasion, and vice versa. This is because communication apparatuses in the context of IEEE 802.11 (Wi-Fi) technologies may include both STA hardware components and AP hardware components. In this manner, the communication apparatuses may switch between a STA mode and an AP mode, based on actual WLAN conditions and/or requirements.

In a MIMO wireless network, "multiple" refers to multiple antennas used simultaneously for transmission and multiple antennas used simultaneously for reception, all over a radio channel. In this regard, "multiple-input" refers to multiple transmitter antennas, which input a radio signal into the channel, and "multiple-output" refers to multiple receiver antennas, which receives the radio signal from the channel and into the receiver. For example, in a N×M MIMO network system, N is the number of transmitter antennas, M is the number of receiver antennas, and N may or may not be equal to M. For the sake of simplicity, the respective numbers of transmitter antennas and receiver antennas are not discussed further in the present disclosure.

In a MIMO wireless network, single-user (SU) communications and multi-user (MU) communications can be deployed for communications between communication apparatuses such as APs and STAs. MIMO wireless network has benefits like spatial multiplexing and spatial diversity, which enable higher data rates and robustness through the use of multiple spatial streams. According to various embodiments, the term "spatial stream" may be used interchangeably with the term "space-time stream" (or STS).

FIG. 1A depicts a schematic diagram of SU-MIMO communications 100 between an AP 102 and a STA 104 in a MIMO wireless network. As shown, the MIMO wireless network may include one or more STAs (e.g. STA 104, STA 106, etc). In the SU-MIMO communications 100, the AP 102 transmits multiple space-time streams using multiple antennas (e.g. 4 antennas as depicted in FIG. 1A) with all the space-time streams directed to a single communication apparatus, i.e. the STA 104. For the sake of simplicity, the multiple space-time streams directed to the STA 104 are illustrated as a grouped data transmission arrow 108 directed to the STA 104.

The SU-MIMO communications 100 can be configured for bi-directional transmissions. As shown in FIG. 1A, in the SU-MIMO communications 100, the STA 104 may transmit multiple space-time streams using multiple antennas (e.g. 2 antennas as depicted in FIG. 1A) with all the space-time streams directed to the AP 102. For the sake of simplicity, the multiple space-time streams directed to the AP 102 are illustrated as a grouped data transmission arrow 110 directed to the AP 102.

As such, the SU-MIMO communications 100 depicted in FIG. 1A enables both uplink and downlink SU transmissions in MIMO wireless network.

FIG. 1B shows a format of a physical layer protocol data unit (PPDU) 150 used for the SU communications as depicted in FIG. 1A. Such a PPDU 150 is interchangeably referred to as a SU PPDU and can be used for both downlink and uplink SU transmissions.

For example, if the MIMO wireless network is a next generation WLAN with an extremely high throughput, such as an EHT WLAN, the SU PPDU 150 may be referred to as EHT SU PPDU 150 and include a non-High Throughput Short Training Field (L-STF), a non-High Throughput Long Training Field (L-LTF), a non-High Throughput Signal Field (L-SIG), a Format Identification field (FIF), an Extremely High Throughput Signal A (EHT-SIG-A) field 154, an Extremely High Throughput Short Training Field (EHT-STF), an Extremely High Throughput Long Training Field (EHT-LTF) 152, a Data field and a Packet Extension (PE) field. It is appreciable that if the IEEE 802.11 Working Group uses a new name instead of "EHT WLAN" for the next generation WLAN with an extremely high throughput, the prefix "EHT" in the above fields may change accordingly.

In a SU PPDU as well as any other types of PPDUs, the EHT-LTF is used to provide information to a receiver (either of a STA in downlink transmissions or of an AP in uplink transmissions) to estimate a channel that a transmitter (either of an AP in downlink transmissions or of a STA in uplink transmissions) uses for communications. The Data field is variable in length, which carries user data payload.

In the SU PPDU 150, the transmitter provides training for $N_{STS}$, total space-time streams used for the transmission of a Physical Layer Service Data Unit (PSDU) in a determined resource unit (RU) of the Data field, where $N_{STS}$, total represents the number of space-time streams in the RU. For example, if the bandwidth of the SU PPDU 150 is 20 MHz, the determined RU is a 242-tone RU. The different types of RU are defined in IEEE P802.11ax/D5.0.

Figures 2A, 2B:
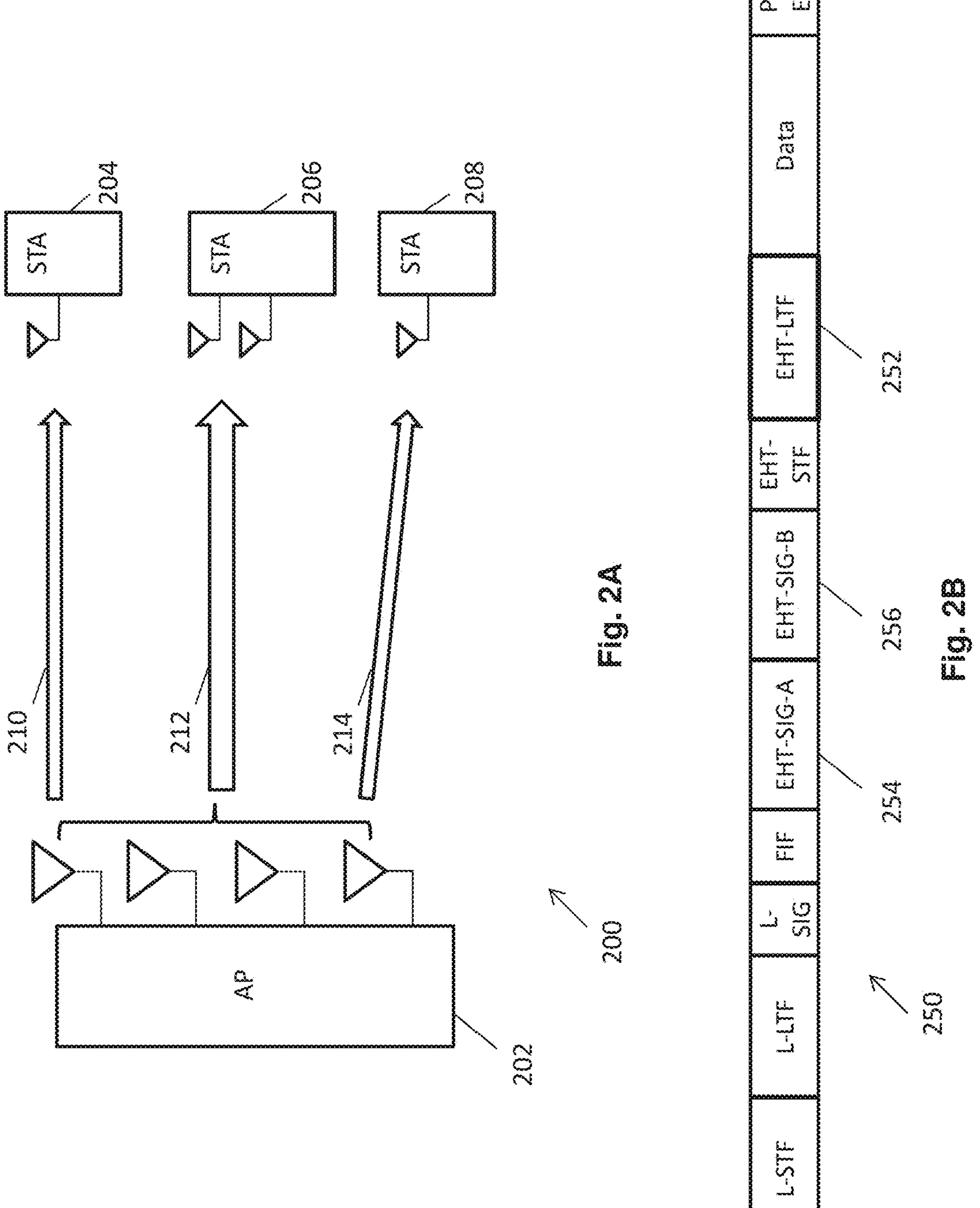
FIG. 2A depicts a schematic diagram of downlink multiuser (MU) MIMO communications between an AP and multiple STAs in a MIMO wireless network.
FIG. 2B shows a format of a PPDU used for downlink MU communications according to various embodiments of the present disclosure.

FIG. 2A depicts a schematic diagram of downlink MU-MIMO communications 200 between an AP 202 and multiple STAs 204, 206, 208 in a MIMO wireless network.

The MIMO wireless network may include one or more STAs (e.g. STA 204, STA 206, STA 208, etc). In the downlink MU-MIMO communications 200, the AP 202 transmits multiple streams simultaneously to the STAs 204, 206, 208 in the network using multiple antennas. For example, two space-time streams may be directed to the STA 206, another space-time stream may be directed to the STA 204, and yet another space-time stream may be directed to the STA 208. For the sake of simplicity, the two space-time streams directed to the STA 206 are illustrated as a grouped data transmission arrow 212, the space-time stream directed to the STA 204 is illustrated as a data transmission arrow 210, and the space-time stream directed to the STA 208 is illustrated as a data transmission arrow 214.

FIG. 2B shows a format of a PPDU 250 used for downlink MU communications between an AP and multiple STAs, including downlink MU-MIMO communications, downlink OFDMA (orthogonal frequency division multiple access) communications or downlink communications combining MU-MIMO with OFDMA. Such a PPDU 250 is referred to as a MU PPDU 250.

As shown in FIG. 2B, if the MIMO wireless network is with an extremely high throughput, such as an EHT WLAN, the MU PPDU 250 may be referred to as EHT MU PPDU 250 and include a L-STF, a L-LTF, a L-SIG, a FIF, an EHT-SIG-A field 254, an Extremely High Throughput Signal B (EHT-SIG-B) field 256, an EHT-STF, an EHT-LTF 252, a Data field and a PE field. As compared to the SU PPDU 150, the MU PPDU 250 includes an additional signal field (e.g. EHT-SIG-B 256) that signals user-specific resource allocation information (e.g. the number of space-time streams, a starting STS number and the allocated RU) for each of the multiple STAs/users communicating with the AP.

As described above, the EHT-LTF in the MU PPDU 250 is used to provide information to a receiver (i.e. of a STA in the downlink MU communications) to estimate a channel that a transmitter (i.e. of an AP in the downlink MU communications) uses for communications. The Data field is variable in length, which carries user data payload.

In the MU PPDU 250, the transmitter provides training for $N_{STS,r,total}$ space-time streams used for the transmission of PSDU(s) in a r-th RU of the Data field, where $N_{STS,r,total}$ represents the number of space-time streams over all the STA(s)/user(s) in the r-th RU.

To enable uplink MU transmissions, trigger-based communications is provided to the MIMO wireless network. In this regard, FIG. 3A depicts a schematic diagram of trigger-based uplink MU communications 300 between an AP 302 and multiple STAs 304, 306, 308 in a MIMO wireless network.

Since there are multiple STAs 304, 306, 308 participating in the trigger-based uplink MU communications, the AP 302 needs to coordinate simultaneous transmissions of multiple STAs 304, 306, 308.

Figures 3A, 3B:
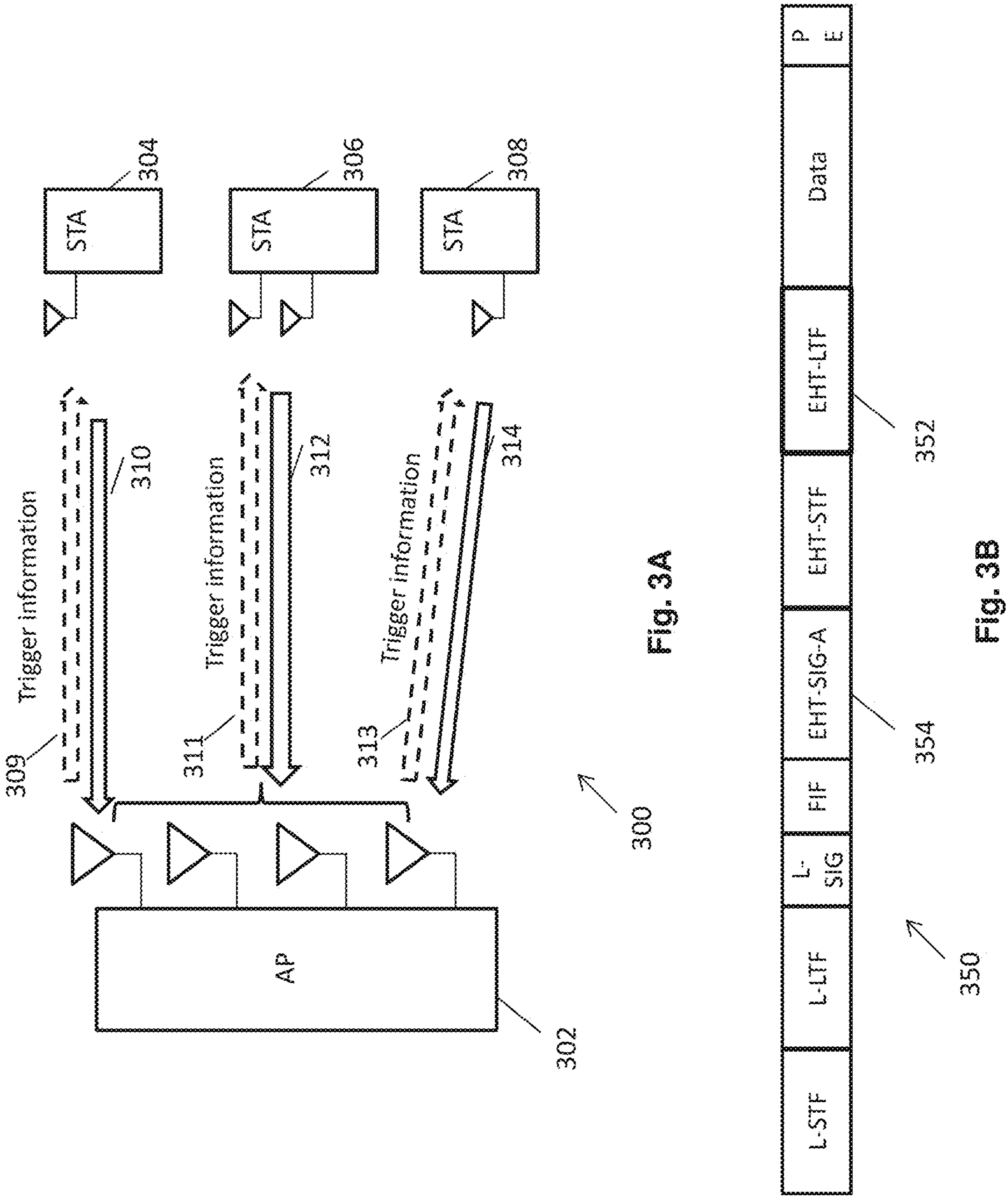
FIG. 3A depicts a schematic diagram of trigger-based uplink MU communications between an AP and multiple STAs in a MIMO wireless network.
FIG. 3B shows a format of a PPDU used for trigger-based uplink MU communications according to various embodiments of the present disclosure.

To do so, as shown in FIG. 3A, the AP 302 transmits trigger information 309, 311, 313 simultaneously to the multiple STAs 304, 306, 308 to indicate user-specific resource allocation information (e.g. the number of space-time streams, a starting STS number and the allocated RU) each STA can use. The trigger information is included in a Trigger frame or in the MAC header of a Quality of Service (QOS) Data frame or a Management frame. In response to the trigger information, the multiple STAs 304, 306, 308 may then arrange uplink transmissions 310, 312, 314 to the AP 302 according to the user-specific resource allocation information indicated in the trigger information.

FIG. 3B shows a format of a PPDU 350 used for trigger-based uplink MU communications between an AP and multiple STAs including uplink MU-MIMO communications, uplink OFDMA communications or uplink communications combining MU-MIMO and OFDMA. Such a PPDU is referred to as a trigger-based (TB) PPDU 350.

As shown in FIG. 3B, if the MIMO wireless network is with an extremely high throughput, such as an EHT WLAN, the TB PPDU 350 may be referred to as EHT TB PPDU 350 and include the same fields as those included in the SU PPDU 150, except that the EHT-STF in the TB PPDU 350 may have a longer duration than that in the SU PPDU 150.

In the TB PPDU 350, the transmitter of user u in a r-th RU provides training for $N_{STS,r,u}$ space-time streams used for uplink transmission of a PSDU in the r-th RU of the Data field, where $N_{STS,r,u}$ represents the number of space-time streams in the r-th RU for user u.

Trigger-based communications is also provided to the MIMO wireless network to enable downlink multi-AP communications. In this regard, FIG. 4A depicts a schematic diagram of downlink multi-AP communications 400, between an STA 402 and multiple APs 404, 406 in a MIMO wireless network.

Since there are multiple APs 404, 406 participating in the trigger-based downlink multi-AP MIMO communications, the master AP 404 needs to coordinate simultaneous transmissions of multiple APs 404, 406.

Figures 4A, 4B:
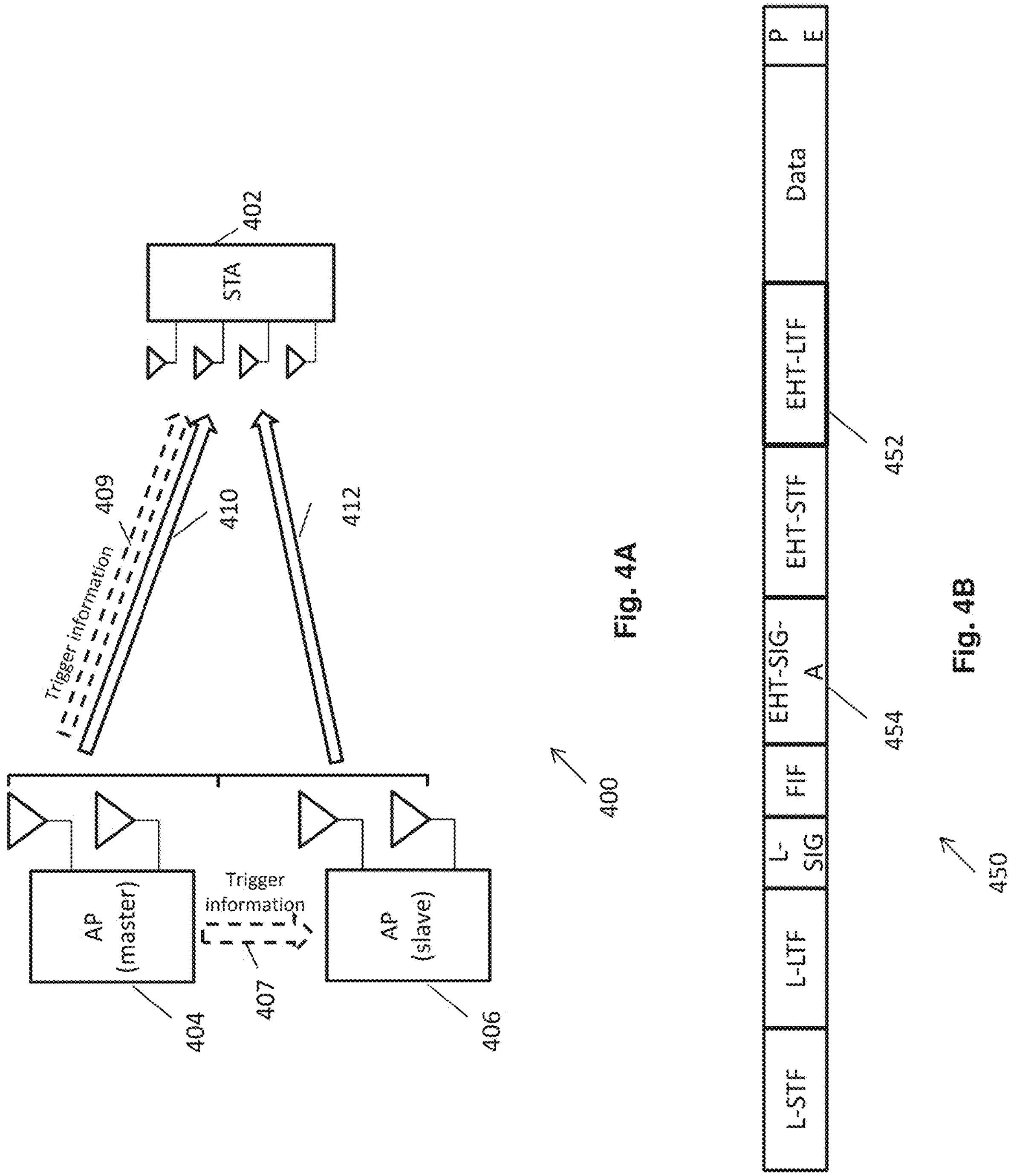
FIG. 4A depicts a schematic diagram of trigger-based downlink multi-AP MIMO communications between multiple APs and a STA in a MIMO wireless network.
FIG. 4B shows a format of a PPDU used for trigger-based downlink multi-AP communications according to various embodiments of the present disclosure.

To do so, as shown in FIG. 4A, the master AP 404 transmits trigger information 407, 409 simultaneously to the AP 406 and the STA 402 to indicate AP-specific resource allocation information (e.g. the number of space-time streams, a starting STS stream number and the allocated RU) each AP can use. The trigger information is included in a Trigger frame. In response to the trigger information, the multiple APs 404, 406 may then arrange downlink transmissions 410, 412 to the STA 402 according to the AP-specific resource allocation information indicated in the trigger information; and the STA 402 may then receive downlink transmissions 410, 412 according to the AP-specific resource allocation information indicated in the trigger information.

FIG. 4B shows a format of a PPDU 450 that may be used for trigger-based downlink multi-AP communications between multiple APs and a STA. Such a PPDU is referred to as a joint transmission (JT) PPDU 450.

As shown in FIG. 4B, if the MIMO wireless network is with an extremely high throughput, such as an EHT WLAN, the JT PPDU 450 may be referred to EHT JT PPDU 450 and include the same fields as those included in the SU PPDU 150, except that the EHT-STF in the JT PPDU 350 may have a longer duration than that in the SU PPDU 150.

In the JT PPDU 450, the transmitter of AP u in a r-th RU provides training for $N_{STS,r,u}$ space-time streams used for a downlink transmission of a PSDU in the r-th RU of the Data field, where $N_{STS,r,u}$ represents the number of space-time streams in the r-th RU for AP u.

It is understood that FIGS. 1A, 2A, 3A and 4A are depicted for illustrating mechanisms of SU, MU or multi-AP communications as described above. For the sake of simplicity, certain components of the APs 102, 202, 302, 404, 406 and the STAs 104, 106, 204, 206, 208, 304, 306, 308, 402 such as transmitters, receivers, etc., are not depicted.

In addition, for the sake of simplicity, each of the APs 102, 202, 302, 404, 406 in FIGS. 1A, 2A, 3A and 4A is depicted to include four or two antennas for data transmission. It is appreciable by those skilled in the art that the APs 102, 202, 302, 404, 406 may include more antennas to achieve high throughput. For example, if the MIMO wireless network is with an extremely high throughput, such as an EHT WLAN in which the maximum number of space-time streams is 16 as described above, each of the APs 102, 202, 302, 404, 406 may include 16 antennas for data transmission. The number of antennas that each of the STAs 104, 106, 204, 206, 208, 304, 306, 308, 402 has may vary accordingly.

Embodiments of the present disclosure provide various technical solutions for channel estimation in the above described SU, MU or multi-AP communications. More importantly and advantageously, the technical solutions of the present disclosure facilitate channel estimation in a MIMO wireless network of an extremely high throughput, such as an EHT WLAN in which the maximum number of space-time streams is increased from 8 to 16.

In order to support communications in the next generation WLAN (e.g. EHT WLAN) in which the maximum number of space-time streams is increased from 8 to 16, the EHT-LTF of the SU PPDU 150, the MU PPDU 250, the TB PPDU 350 and the JT PPDU 450 needs to support up to 16 space-time streams.

As discussed in non-patent literature IEEE 802.11-18/1967r1 (Overview of PHY Features for EHT, January 2019), a time-domain-based method or frequency-domain-based method may be used to process the EHT-LTF symbols for channel estimation.

For the time-domain-based method, similarly to 11ax HE-LTF, more EHT-LTF symbols are required as the number of space-time streams increases. For example, 16 EHT-LTF symbols are required to support 16 space-time streams. As a result, new P matrices of order larger than 8 need to be defined. Further, EHT-LTF overhead increases significantly as the number of space-time streams increases.

On the other hand, for the frequency-domain-based method, orthogonal subcarriers/tones of EHT-LTF symbols are used for channel estimation. For an example of a two-stream case, one EHT-LTF symbol is needed where odd and even indexed subcarriers are allocated to different streams and interpolation/extrapolation can be additionally used for channel estimation. However, channel estimation accuracy may be reduced as the number of space-time streams increases.

In order to support communications in the next generation WLAN (e.g. EHT WLAN) in which the maximum number of space-time streams is increased from 8 to 16, the present disclosure advantageously provides communication apparatuses and communication methods that are configured to construct/generate the EHT-LTF to support up to 16 space-time streams for channel estimation in the above described SU, MU or multi-AP communications.

According to various embodiments of the present disclosure, the EHT-LTF field comprises one or more EHT-LTF symbols for MIMO channel estimation. Each of the one or more EHT-LTF symbols comprises a plurality of data subcarriers/tones and a plurality of pilot subcarriers/tones.

According to a first embodiment, the number of EHT-LTF symbols is given by:

$$N_{EHT-LTF} = \begin{cases} \lceil N_{STS}/2 \rceil, & N_{STS} = 2, 3, 4, 7, 8, 11, 12, 15, 16 \\ \lceil N_{STS}/2 \rceil + 1, & N_{STS} = 5, 6, 9, 10, 13, 14 \end{cases}$$

where $N_{STS}$ is

- number of space-time streams in a SU PPDU;
- the maximum of $N_{STS,r,total}$ for each RU r in a MU PPDU;
- the maximum of $N_{STS,r,u}$ for each RU r and each user u in a TB PPDU; or
- the maximum of $N_{STS,r,u}$ for each RU r and each AP u in a JT PPDU.

Figure 5:
FIG. 5 shows a table displaying values of $N_{STS}$ with its corresponding $N_{EHT\text{-}LTF}$ values according to a first embodiment of the present disclosure.

The relationship between the values of the $N_{EHT-LTF}$ and $N_{STS}$ as shown in the above formula can be seen in the table 500 of FIG. 5. For example, when the $N_{STS}$ is 2, the corresponding $N_{EHT-LTF}$ value is 1; when the $N_{STS}$ is 3 or 4, the corresponding $N_{EHT-LTF}$ value is 2; when the $N_{STS}$ is 5 to 8, the corresponding $N_{EHT-LTF}$ value is 4; when the $N_{STS}$ is 9 to 12, the corresponding $N_{EHT-LTF}$ value is 6; and when the $N_{STS}$ is 13 to 16, the corresponding $N_{EHT-LTF}$ value is 8.

With the EHT-LTF symbols, a time-frequency-domain based method may be used to facilitate channel estimation, comprising the following steps:

- An EHT-LTF sequence is mapped to data tones and pilot tones of each of the EHT-LTF symbols;
- Data tones with nonzero EHT-LTF sequence values are equally grouped into a first tone group and a second tone group;
- Space-time streams are grouped into a first stream group and a second stream group;
- If $N_{EHT-LTF}$=1, a first STS is mapped to data tones in the first tone group of an EHT-LTF symbol; while a second STS is mapped to data tones in the second tone group of the EHT-LTF symbol; and a pilot stream is mapped to pilot tones of the EHT-LTF symbol.
- If $N_{EHT-LTF}$=2, 4, 6 or 8, one or more space-time streams in the first stream group are multiplexed to data tones in the first tone group for each of all EHT-LTF symbols by applying a $P_1$ matrix; while one or more space-time streams in the second stream group are multiplexed to data tones in the second tone group for each of all the EHT-LTF symbols by applying a $P_2$ matrix. Further, a pilot stream is mapped to pilot tones of all the EHT-LTF symbols by applying the first row of the $P_1$ matrix.

The $P_1$ matrix is a unitary matrix, e.g. $P_{2\times2}$, $P_{4\times4}$, $P_{6\times6}$ or $P_{8\times8}$ when $N_{EHT-LTF}$=2, 4, 6 or 8, which are defined in IEEE 802.11-2016 standard. The $P_2$ matrix is also a unitary matrix. In an embodiment, the $P_2$ matrix may be the same as the $P_1$ matrix. In another embodiment, the $P_2$ matrix is a permutation of the $P_1$ matrix. For example, the n-th row of the $P_2$ matrix is the ($N_{EHT-LTF}$+1−n)-th row of the $P_1$ matrix, as follows:

$$P_2(n, :) = P_1(N_{EHT-LEF} + 1 - n, :)$$

By doing so, different rows of the $P_1$ matrix can be assigned to space-time streams in the first stream group and space-time streams in the second stream group as much as possible and thus interference between space-time streams in the first stream group and the second stream group is minimized.

Advantageously, there is no need to define new P matrices to accommodate the EHT-LTF symbols as the number of EHT-LTF symbols is not larger than 8. Furthermore, a good tradeoff between EHT-LTF overhead and channel estimation accuracy is also realised.

When grouping data tones with nonzero EHT-LTF sequence values in accordance with the above time-frequency-domain based method, the first tone group may comprise every second data tones with nonzero EHT-LTF sequence values starting with the first data tone with nonzero EHT-LTF sequence value; while the second tone group may comprise every second data tones with nonzero EHT-LTF sequence values starting with the second data tone with nonzero EHT-LTF sequence value. Indices of data tones with nonzero EHT-LTF sequence values depend on EHT-LTF type, bandwidth and RU type.

The grouping of data tones is now further explained. Suppose the EHT-LTF sequences are similar to the 11ax HE-LTF sequences and the EHT-LTF has the similar types to the 11ax HE-LTF (see IEEE P802.11ax/D5.0). An EHT-LTF for 20 MHz bandwidth, 242-tone RU and 2× EHT-LTF is assumed in the following example. The indices of data tones comprises [−122:−2, 2:122] excluding the indices of pilot tones {±116, ±90, ±48, ±22}. Among these data tones, the indices of data tones with nonzero EHT-LTF sequence values are:

{±122, ±120, ±118, ±114, ±112, ±110, ±108, ±106, ±104, ±102, ±100, ±98, ±96, ±94, ±92, ±88, ±86, ±84, ±82, ±80, ±78, ±76, ±74, ±72, ±70, ±68, ±66, ±64, ±62, ±60, ±58, ±56, ±54, ±52, ±50, ±46, ±44, ±42, ±40, ±38, ±36, ±34, ±32, ±30, ±28, ±26, ±24, ±20, ±18, ±16, ±14, ±12, ±10, ±8, ±6, ±4, ±2}

These data tones with nonzero EHT-LTF sequence values are then grouped into the first tone group and second tone group as mentioned above. Therefore, the first tone group comprises every second data tones with nonzero EHT-LTF sequence values starting with the first data tone with nonzero EHT-LTF sequence value, as follows:

{−122, −118, −112, −108, −104, −100, −96, −92, −86, −82, −78, −74, −70, −66, −62, −58, −54, −50, −44, −40, −36, −32, −28, −24, −18, −14, −10, −6, −2, 4, 8, 12, 16, 20, 26, 30, 34, 38, 42, 46, 52, 56, 60, 64, 68, 72, 76, 80, 84, 88, 94, 98, 102, 106, 110, 114, 120}

The second tone group comprises every second data tones with nonzero EHT-LTF sequence values starting with the second data tone with nonzero EHT-LTF sequence value, as follows:

{−120, −114, −110, −106, −102, −98, −94, −88, −84, −80, −76, −72, −68, −64, −60, −56, −52, −46, −42, −38, −34, −30, −26, −20, −16, −12, −8, −4, 2, 6, 10, 14, 18, 24, 28, 32, 36, 40, 44, 50, 54, 58, 62, 66, 70, 74, 78, 82, 86, 92, 96, 100, 104, 108, 112, 118, 122}

In another example, assuming an EHT-LTF for 20 MHz bandwidth, 242-tone RU and 1× EHT-LTF, the indices of data tones would comprise [−122:−2, 2:122] excluding the indices of pilot tones {+116, +48}, i.e. 1× EHT-LTF comprises twice the amount of subcarrier spacing than 2× EHT-LTF. Among these data tones, the indices of data tones with nonzero EHT-LTF sequence values are:

{±120, ±112, ±108, ±104, ±100, ±96, ±92, ±88, ±84, ±80, ±76, ±72, ±68, ±64, ±60, ±56, ±52, ±44, ±40, ±36, ±32, ±28, ±24, ±20, ±16, ±12, ±8, ±4}

As per above, these data tones with nonzero EHT-LTF sequence values are then grouped into the first tone group and second tone group as mentioned above. Therefore, the first tone group comprises every second data tones with nonzero EHT-LTF sequence values starting with the first data tone with nonzero EHT-LTF sequence value, as follows:

{−120, −108, −100, −92, −84, −76, −68, −60, −52, −40, −32, −24, −16, −8, 4, 12, 20, 28, 36, 44, 56, 64, 72, 80, 88, 96, 104, 112}

The second tone group comprises every second data tones with nonzero EHT-LTF sequence values starting with the second data tone with nonzero EHT-LTF sequence value, as follows:

{−112, −104, −96, −88, −80, −72, −64, −56, −44, −36, −28, −20, −12, −4, 8, 16, 24, 32, 40, 52, 60, 68, 76, 84, 92, 100, 108, 120}

When grouping the space-time streams in accordance with the above time-frequency-domain-based method, the first stream group may comprise first $\lceil N_{STS}/2 \rceil$ or $\lfloor N_{STS}/2 \rfloor$ space-time streams while the second stream group comprises remaining space-time streams. In an embodiment, the first stream group comprises odd indexed space-time streams while the second stream group comprises even indexed space-time streams. An advantageous effect of this grouping is that frequency diversity may be improved when more than one consecutive space-time streams are allocated to a single STA.

FIG. 6A shows an example table 600 of a grouping wherein the first stream group comprises first $\lceil N_{STS}/2 \rceil$ or $\lfloor N_{STS}/2 \rfloor$ space-time streams while the second stream group comprises remaining space-time streams for $N_{STS}=10$ and $N_{EHT\text{-}LTF}=6$. Accordingly, the data tones of the first tone group correspond to STS 1, 2, 3, 4 and 5 for each of the 6 EHT-LTF symbols, while the data tones of the second tone group correspond to STS 6, 7, 8, 9 and 10 for each of the 6 EHT-LTF symbols.

On the other hand, FIG. 6B shows an example table 602 of a grouping wherein the first stream group comprises odd indexed space-time streams while the second stream group comprises even indexed space-time streams for $N_{STS}=10$ and $N_{EHT\text{-}LTF}=6$. Accordingly, the data tones of the first tone group correspond to STS 1, 3, 5, 7 and 9 for each of the 6 EHT LTF symbols, while the data tones of the second tone group correspond to STS 2, 4, 6, 8 and 10 for each of the 6 EHT LTF symbols.

Figure 7:
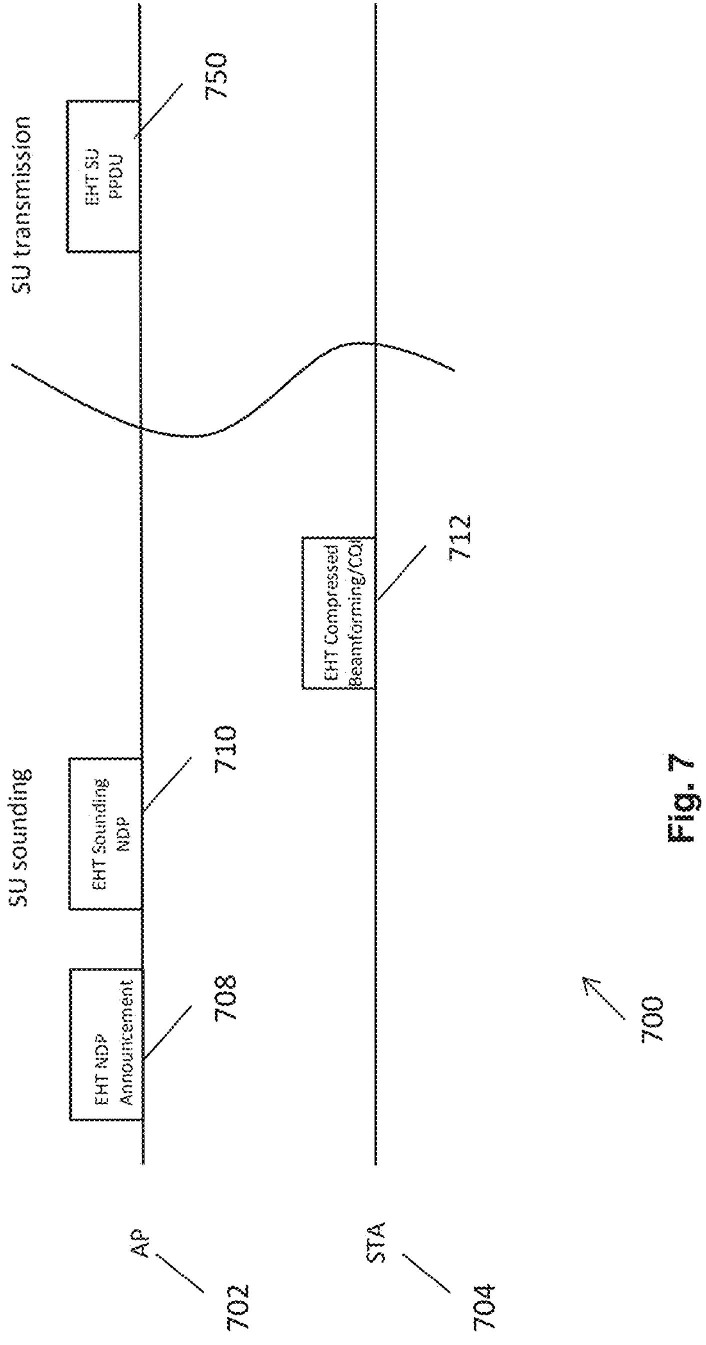
FIG. 7 shows a flowchart illustrating downlink SU sounding and transmission in accordance with various embodiments of the present disclosure.

FIG. 7 shows a flowchart 700 illustrating downlink SU sounding and transmission in accordance with various embodiments of the present disclosure. AP 702 transmits an EHT NDP (null data packet) Announcement frame 708 to STA 704. The EHT NDP Announcement frame 708 contains control information on sounding procedure such as sounding type and feedback type. For example, the sounding type can be single-transmitter-based sounding or multi-AP-based sounding, and the feedback type can be SU feedback, MU feedback or CQI (channel quality indicator) feedback. For downlink SU sounding, the EHT NDP Announcement frame 708 contains information indicating that the sounding type is single-transmitter-based sounding and the feedback type is SU feedback.

The AP 702 then transmits an EHT sounding NDP 710 to the STA 704. The format of the EHT sounding NDP 710 is the same as that of the SU PPDU 150 as described in FIG. 1B. However, the data field and the PE field in the EHT sounding NDP 710 are empty. The EHT-SIG-A field of the EHT sounding NDP 710 contains information on the number of space-time streams $N_{STS}$ that will be used for channel sounding. In response to the EHT sounding NDP 710, the STA 704 transmits an EHT Compressed Beamforming/CQI frame 712 to the AP 702. The EHT Compressed Beamforming/CQI frame 712 contains a beamforming (BF) report, which is prepared according to the control information on sounding procedure indicated in the EHT NDP Announcement frame 708. The AP 702 then prepares the EHT SU PPDU 750 based on the BF report and transmits it to the STA 704. The EHT SU PPDU 750 is in the same format as the SU PPDU 150. The EHT-SIG-A field of the EHT SU PPDU 750 contains information on the number of space-time streams $N_{STS}$ that will be used for a PSDU contained in the Data field.

Accordingly, channel estimation performed by the STA 704 in SU sounding or transmission is as follows:

Obtain the number $N_{STS}$ of space-time streams from the EHT-SIG-A field of the EHT sounding NDP 710 or EHT SU PPDU 750 and determine the number $N_{EHT\text{-}LTF}$ of EHT-LTF symbols;

Estimate residual CFO (carrier frequency offset) based on pilot tones of the EHT-LTF symbols;

Obtain channel matrix $H_k$ corresponding to data tone $k(k=1, 2, \ldots, N_{DT})$ by $$\hat{H}_k = \frac{Y_k \cdot P^H}{EHTLTF_k \cdot N_{EHT-LTF}}$$

where $Y_k=[\vec{Y}_{k,1}, \ldots, Y_{k,NEHT\text{-}LTF}]$ is a matrix of dimension $N_{RX}\times N_{EHT\text{-}LTF}$ that collects the received signal vectors $\vec{Y}_{k,n}$ corresponding to the k-th data tone and the n-th EHT-LTF symbol; $N_{DT}$ is the number of data tones per EHT-LTF symbol; $N_{RX}$ is the number of receive antennas; and P is the first $N_{EHT\text{-}LTF}$ rows of the $P_1$ or $P_2$ matrix depending on whether data tone k belongs to the first tone group or the second tone group;

Obtain channel estimates for space-time streams in the first stream group over data tones in the first tone group and channel estimates for space-time streams in the second stream group over data tones in the second tone group after residual CFO compensation; and Obtain channel estimates for space-time streams in the first stream group over data tones in the second tone group and channel estimates for space-time streams in the second stream group over data tones in the first tone group by interpolation or extrapolation.

Figure 8:
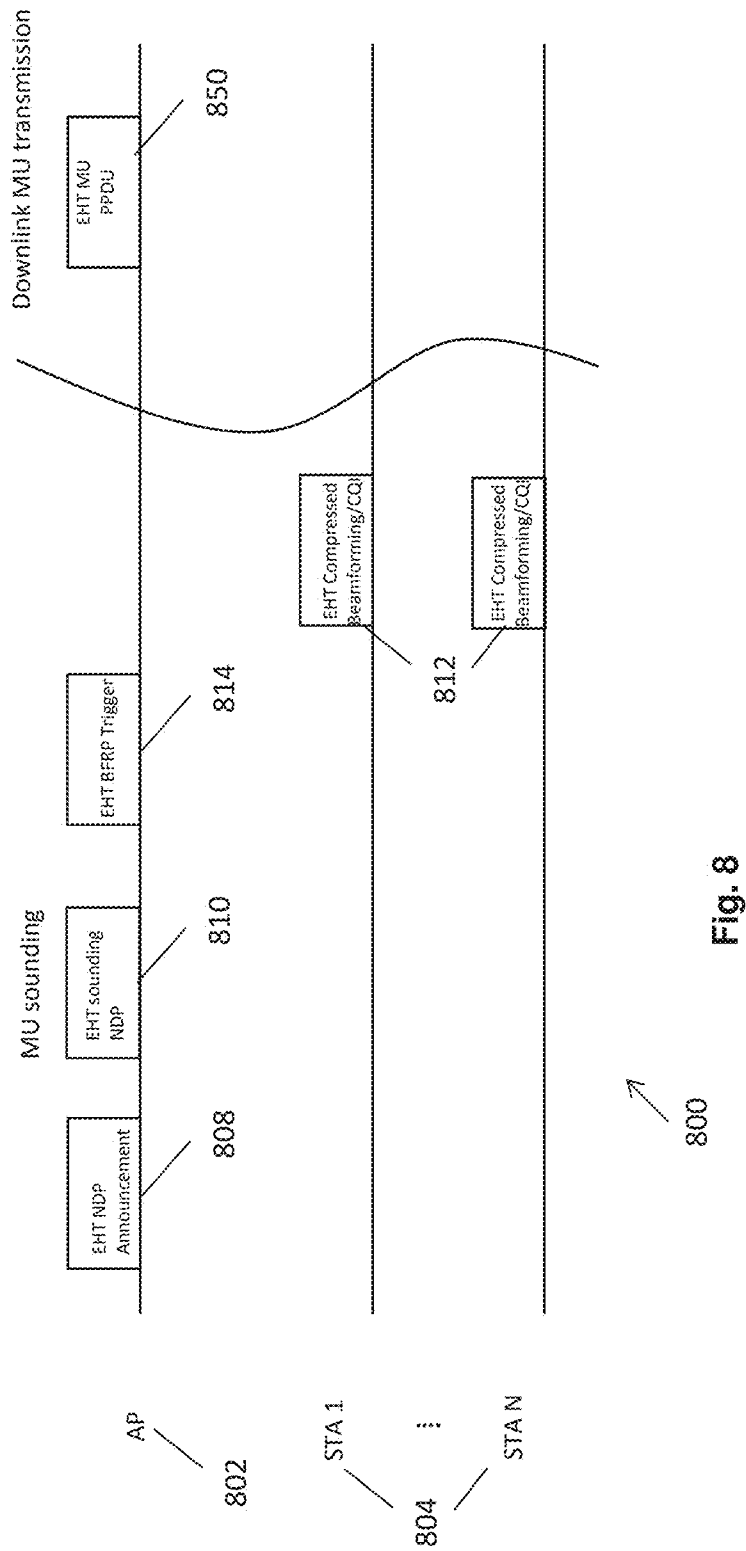
FIG. 8 shows a flowchart illustrating downlink MU sounding and transmission in accordance with various embodiments of the present disclosure.

FIG. 8 shows a flowchart 800 illustrating downlink MU sounding and transmission in accordance with various embodiments of the present disclosure. AP 802 transmits an EHT NDP Announcement frame 808 to a plurality of STAs 804, which is in the same format as the EHT NDP Announcement frame 708. For downlink MU sounding, the EHT NDP Announcement frame 808 contains information indicating that the sounding type is single-transmitter-based sounding and the feedback type is MU feedback.

The AP 802 then transmits an EHT sounding NDP 810 to the plurality of STAs 804. The format of the EHT sounding NDP 810 is the same as that of the SU PPDU 150 as described in FIG. 1B. However, the Data field and the PE field in the EHT sounding NDP 810 are empty. The EHT-SIG-A field of the EHT sounding NDP 810 contains information on the number of space-time streams used for channel sounding. The AP 802 also transmits an EHT BFRP (BF report poll) Trigger frame 814 that is used to collect BF reports from the plurality of STAs 804. In response to the EHT sounding NDP 810 and EHT BFRP Trigger frame 814, each of the plurality of STAs 804 transmits an EHT Compressed Beamforming/CQI frame 812 to the AP 802 according to user-specific resource allocation information indicated in the EHT BFRP Trigger frame 814. Each of the EHT Compressed Beamforming/CQI frames 812 contains a BF report, which is prepared according to the control information indicated in the EHT NDP Announcement frame 808. The AP 802 then prepares the EHT MU PPDU 850 based on all the BF reports received from the plurality of STAs 804 and transmits it to the plurality of STAs 804. The EHT MU PPDU 850 is in the same format as the MU PPDU 250. the EHT-SIG-A field of the EHT MU PPDU 850 contains information on the number of EHT-LTF symbols $N_{EHT\text{-}LTF}$, and the EHT-SIG-B field contains information on the number of space-time streams and the starting STS number for each intended STA.

Accordingly, channel estimation performed by each of the plurality of STAs 804 in MU transmission is as follows:

Obtain its own number of space-time streams and starting STS number from the EHT-SIG-B field of the EHT MU PPDU 850 and the number $N_{EHT\text{-}LTF}$ of EHT-LTF symbols from the EHT-SIG-A field;

Estimate residual CFO based on pilot tones of the EHT-LTF symbols;

Obtain channel matrix $H_k$ corresponding to data tone k $(k=1, 2, \ldots, N_{DT})$ by $$\hat{H}_k = \frac{Y_k \cdot P^H}{EHTLTF_k \cdot N_{EHT-LTF}}$$

where $Y_k=[\vec{Y}_{k,1}, \ldots, \vec{Y}_{k,NEHT\text{-}LTE}]$ is a matrix of dimension $N_{RX}\times N_{EHT\text{-}LTF}$ that collects the received signal vectors $\vec{Y}_{k,n}$ corresponding to the k-th data tone and the n-th EHT-LTF symbol; $N_{DT}$ is the number of data tones per EHT-LTF symbol; and P is the $P_1$ or $P_2$ matrix depending on whether data tone k belongs to the first tone group or the second tone group; $N_{RX}$ is the number of receive antennas; and P is the rows of the $P_1$ or $P_2$ matrix corresponding to its own space-time streams and whether the $P_1$ or $P_2$ matrix is used depends on whether data tone k belongs to the first tone group or the second tone group;

Obtain channel estimates for its own space-time streams in the first stream group over data tones in the first tone group and channel estimates for its own space-time streams in the second stream group over data tones in the second tone group after residual CFO compensation; and Obtain channel estimates for its own space-time streams in the first stream group over data tones in the second tone group and channel estimates for its own space-time streams in the second stream group over data tones in the first tone group by interpolation or extrapolation.

Figure 9:
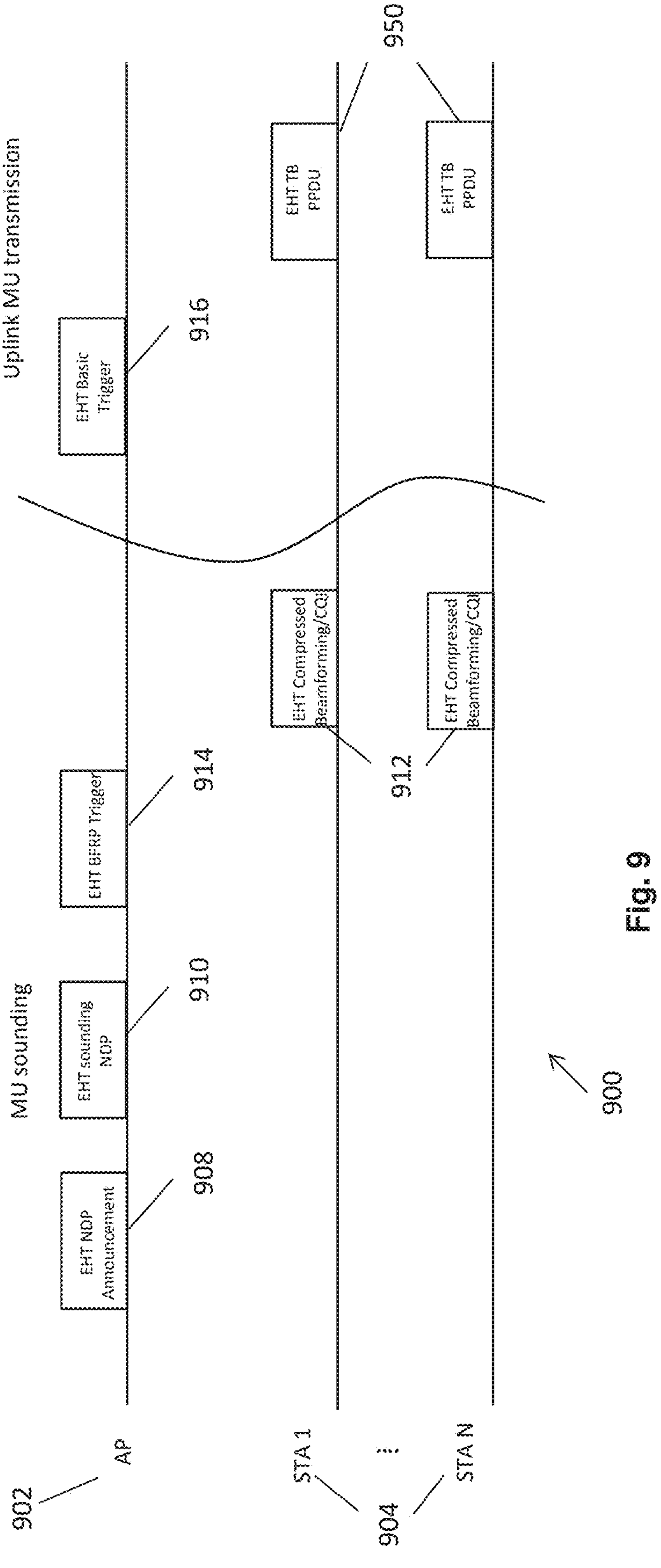
FIG. 9 shows a flowchart illustrating uplink MU sounding and transmission in accordance with various embodiments of the present disclosure.

FIG. 9 shows a flowchart 900 illustrating uplink MU sounding and transmission in accordance with various embodiments of the present disclosure. AP 902 transmits an EHT NDP Announcement frame 908 to a plurality of STAs 904, which is in the same format as the EHT NDP Announcement frame 708. Uplink MU sounding is similar to downlink MU sounding and the EHT NDP Announcement frame 908 contains information indicating that the sounding type is single-transmitter-based sounding and the feedback type is MU feedback.

The AP 902 then transmits a EHT sounding NDP 910 to the plurality of STAs 904. The AP 902 also transmits an EHT BFRP Trigger frame 914 that is used to collect BF reports from the plurality of STAs 904. In response to the EHT sounding NDP 910 and EHT BFRP Trigger frame 914, each of the plurality of STAs 904 transmits an EHT Compressed Beamforming/CQI frame 912 to the AP 902 according to user-specific resource allocation information indicated in the EHT BFRP Trigger frame 914. The EHT Compressed Beamforming/CQI frame 912 contains a BF report, which is prepared according to the control information indicated in the EHT NDP Announcement frame 908. The AP 902 then prepares the EHT Basic Trigger frame 916 according to all the BF reports received from the plurality of STAs 904 and transmits it to the plurality of STAs 904. The EHT Basic Trigger frame 916 contains information on the number of EHT-LTF symbols $N_{EHT-LTF}$, as well as information on the number of space-time streams and the starting STS number for each scheduled STA. In response to the EHT Basic Trigger frame transmission, each of the plurality of STAs 904 transmits an EHT TB PPDU 950 to the AP 902 based on the information contained in the EHT Basic Trigger frame 916. The EHT TB PPDU 950 is in the same format as the TB PPDU 350.

Accordingly, channel estimation performed by the AP 902 in uplink MU transmission is as follows:

Obtain the number of space-time streams and starting STS number for each scheduled STA and the number of EHT-LTF symbols from the EHT Basic Trigger frame for soliciting the uplink MU transmission;

Estimate residual CFO based on pilot tones of the EHT-LTF symbols;

Obtain channel matrix $H_k$ corresponding to data tone k (k=1, 2, . . . , $N_{DT}$) by $$\hat{H}_k = \frac{Y_k \cdot P^H}{EHTLTF_k \cdot N_{EHT-LTF}}$$

where $Y_k=[\vec{Y}_{k,1}, \ldots, \vec{Y}_{k,NEHT-LTF}]$ IS a matrix of dimension $N_{RX}\times N_{EHT-LTF}$ that collects the received signal vectors $\vec{Y}_{k,n}$ corresponding to the k-th data tone and the n-th EHT-LTF symbol; $N_{DT}$ is the number of data tones per EHT-LTF symbol; and P is the $P_1$ or $P_2$ matrix depending on whether data tone k belongs to the first tone group or the second tone group; $N_{RX}$ is the number of receive antennas; and P is the $P_1$ or $P_2$ matrix depending on whether data tone k belongs to the first tone group or the second tone group;

For each scheduled STA, obtain channel estimates for space-time streams in the first stream group over data tones in the first tone group and channel estimates for space-time streams in the second stream group over data tones in the second tone group after residual CFO compensation; and For each scheduled STA, obtain channel estimates for space-time streams in the first stream group over data tones in the second tone group and channel estimates for space-time streams in the second stream group over data tones in the first tone group by interpolation or extrapolation.

For application of the presently discussed methods in a multi-AP system, the total number of space-time streams allocated to all APs in a multi-AP system may be assumed to be:

$$N_{STS} = \sum_{i=1}^{N_{AP}} N_{STS,i} \leq 16$$

where $N_{STS,i}$ is the number of space-time streams allocated to the i-th AP and $N_{AP}$ IS the number of APs in the multi-AP system and not larger than $N_{EHT-LTF}$. This ensures that the $P_1$ matrix, $P_2$ matrix and R matrix need not be larger than size 8×8 when applying the time-frequency-domain-based method to a multi-AP system.

Accordingly, time-frequency-domain-based method when applied to a multi-AP system is as follows:

An EHT-LTF sequence is mapped to data tones and pilot tones of each of the EHT-LTF symbols;

Data tones with nonzero EHT-LTF sequence values are equally grouped into a first tone group and a second tone group;

Space-time streams are grouped into a first stream group and a second stream group;

One or more space-time streams in the first stream group are multiplexed to data tones in the first tone group for each of all EHT-LTF symbols by applying the $P_1$ matrix; while one or more space-time streams in the second stream group are multiplexed to data tones in the second tone group for each of all EHT-LTF symbols by applying the $P_2$ matrix; and $N_{AP}$ AP-specific pilot streams are multiplexed to pilot tones of all EHT-LTF symbols by applying the $P_1$ matrix, wherein the pilot stream for the i-th AP corresponds to the i-th row of the $P_1$ matrix.

Figure 10:
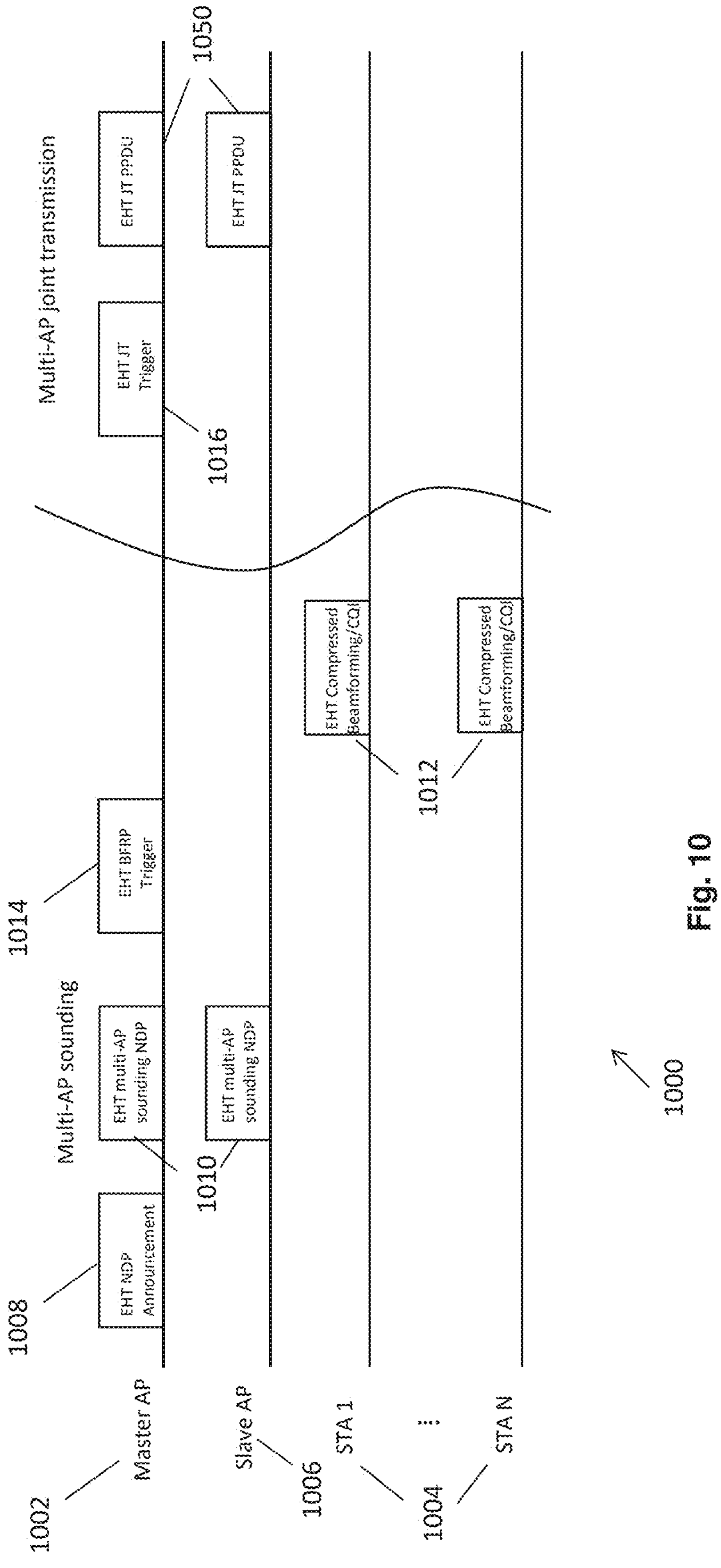
FIG. 10 shows a flowchart illustrating multi-AP sounding and multi-AP joint transmission in accordance with various embodiments of the present disclosure.

FIG. 10 shows a flowchart 1000 illustrating multi-AP sounding and joint transmission in accordance with various embodiments of the present disclosure. In this example, two APs are assumed, i.e. a master AP 1002 and a slave AP 1006. The master AP 1002 transmits an EHT NDP Announcement frame 1008, which is in the same format as the EHT NDP Announcement frame 708. For multi-AP sounding, the EHT NDP Announcement frame 1008 contains information indicating that the sounding type is multi-AP-based sounding and the feedback type is MU feedback. Additionally, the EHT NDP Announcement frame 1008 contains common control information such as the number of EHT-LTF symbols $N_{EHT-LTF}$ and necessary information for constructing EHT-SIG-A fields of following EHT multi-AP sounding NDPs (e.g. bandwidth, guard interval and EHT-LTF Type). The EHT NDP Announcement frame 1008 also contains AP-specific control information such as the number of space-time streams and the starting STS number for each AP.

Thereafter, each of the master AP 1002 and slave AP 1006 transmits an EHT multi-AP sounding NDP 1010 to the plurality of STAs 1004 according to control information indicated in the EHT NDP Announcement frame 1008. The EHT multi-AP sounding NDP 1010 has a similar format to the JT PPDU 450 as shown in FIG. 4B without Data field and PE field; and EHT-SIG-A fields of EHT multi-AP sounding NDPs transmitted by master AP and slave AP(s) contain the same information. The master AP 1002 also transmits an EHT BFRP Trigger frame 1014 that is used to collect BF reports from the plurality of STAs 1004. In response to the EHT multi-AP sounding NDPs 1010 and EHT BFRP trigger frame 1014, each of the plurality of STAs 1004 transmits an EHT Compressed Beamforming/CQI frame 1012 to the APs according to user-specific resource allocation information indicated in the EHT BFRP Trigger frame 1014. Each EHT Compressed Beamforming/CQI frame 1012 contains a BF report, which is prepared according to the control information indicated in the EHT NDP Announcement frame 1008.

The master AP 1002 then prepares an EHT JT Trigger frame 1016 according to all the BF reports received from the plurality of STAs 1004 and transmits it to the slave AP 1006 to trigger multi-AP joint transmission. The EHT JT Trigger frame 1016 contains information on the number of space-time streams and the starting STS number for each AP and the number of EHT-LTF symbols $N_{EHT-LTF}$ as well as necessary information for constructing EHT-SIG-A fields of following EHT JT PPDUs (e.g. bandwidth, guard interval and EHT-LTF Type). Further, EHT-SIG-A fields of EHT JT PPDUs transmitted by master AP and slave AP(s) contain the same information. In response to the EHT JT Trigger frame transmission, each of the master AP 1002 and the slave AP 1006 transmits an EHT JT PPDU 1050 to the intended STAs 1004 based on the information contained in the EHT JT Trigger frame 1016. Each of the intended STAs 1004 receives the EHT JT PPDUs 1050 based on the information contained in the EHT JT Trigger frame 1016. The EHT JT PPDU 1050 is in the same format as the JT PPDU 450.

Accordingly, the EHT-LTF of the EHT multi-AP sounding NDP 1010 or EHT JT PPDU 1050 is generated by the master AP 1002 or the slave AP 1006 as follows:

Obtain its own number of space-time streams and starting STS number from EHT NDP Announcement frame 1008 or EHT JT Trigger frame 1016;

Multiplex its own space-time streams in the first stream group to data tones in the first tone group for each of all EHT-LTF symbols by applying the corresponding rows of the $P_1$ matrix;

Multiplex its own space-time streams in the second stream group to data tones in the second tone group for each of all EHT-LTF symbols by applying the corresponding rows of the $P_2$ matrix; and Multiplex its own pilot stream to pilot tones of all EHT-LTF symbols by applying the corresponding row of the $P_1$ matrix.

Accordingly, channel estimation performed by each intended STA 1004 in multi-AP sounding or transmission is as follows:

Obtain the number of space-time streams and starting STS number for each AP and the number of EHT-LTF symbols from EHT NDP Announcement frame or EHT JT Trigger frame;

Estimate AP-specific residual CFOs based on pilot tones of the EHT-LTF symbols;

Obtain channel matrix $H_k$ corresponding to data tone k (k=1, 2, . . . , $N_{DT}$) by $$\hat{H}_K = \frac{Y_k \cdot P^H}{EHTLTF_k \cdot N_{EHT-LTF}}$$

where $Y_k=[Y_{k,1}, \ldots, Y_{k,NEHT-LTF}]$ is a matrix of dimension $N_{RX} \times N_{EHT-LTF}$ that collects the received signal vectors $Y_{k,n}$ corresponding to the k-th data tone and the n-th EHT-LTF symbol; Nor is the number of data tones per EHT-LTF symbol; and P is the $P_1$ or $P_2$ matrix depending on whether data tone k belongs to the first tone group or the second tone group; $N_{RX}$ is the number of receive antennas; and P is the $P_1$ or $P_2$ matrix depending on whether data tone k belongs to the first tone group or the second tone group;

Obtain channel estimates for space-time streams in the first stream group over data tones in the first tone group and channel estimates for space-time streams in the second stream group over data tones in the second tone group after AP-specific residual CFO compensation; and Obtain channel estimates for space-time streams in the first stream group over data tones in the second tone group and channel estimates for space-time streams in the second stream group over data tones in the first tone group by interpolation or extrapolation.

In a second embodiment, a variation of the time-frequency-domain-based method may be applied for the following three cases:

$N_{EHT-LTF}$=4 and $N_{STS}$=5 or 6

$N_{EHT-LTF}$=6 and $N_{STS}$=9 or 10

$N_{EHT-LTF}$=8 and $N_{STS}$=13 or 14

Accordingly, the time-frequency-domain-based method variation for the above three cases may be applied as follows:

EHT-LTF symbols are grouped into two symbol groups; the first symbol group comprises first ($N_{EHT-LTF}$−2) EHT-LTF symbols while the second symbol group comprises the last two symbols;

Space-time streams are grouped into three stream groups: The first and second stream groups comprises first ($N_{EHT-LTF}$−2)×2 space-time streams while the third stream group comprises remaining one or two space-time streams;

The first ($N_{EHT-LTF}$−2)×2 space-time streams are grouped into the first and second stream groups in the same manner as the original time-frequency-domain-based method;

Space-time streams in the first and second stream groups are multiplexed on the EHT-LTF symbols in the first symbol group in the same manner as the original time-frequency-domain-based method; and Space-time streams in the third stream group are multiplexed on the EHT-LTF symbols in the second symbol group in a different manner from the original time-frequency-domain-based method.

In a first option, one or two space-time streams in the third stream group are multiplexed on the EHT-LTF symbols in the second symbol group using the $P_{2\times2}$ matrix. In a second option, in case of two space-time streams in the third stream group, first STS is mapped on data tones of the first tone group of the first EHT-LTF symbol and data tones of the second tone group of the second EHT-LTF symbol; second STS is mapped on data tones of the second tone group of the first EHT-LTF symbol and data tones of the first tone group of the second EHT-LTF symbols.

Figures 11A, 11B:
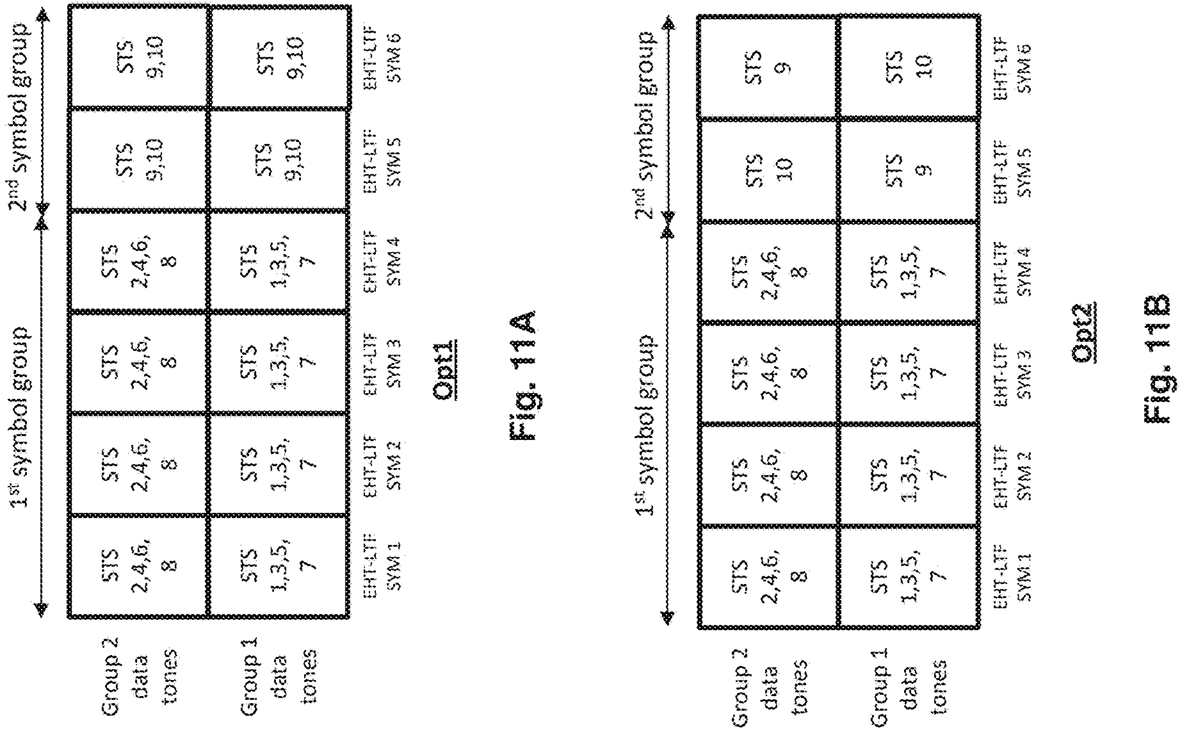
FIGS. 11A and 11B show schematic examples of how space-time streams and data tones may be grouped in accordance with a second embodiment of the present disclosure.

The above grouping is illustrated in FIG. 11A for the first option and FIG. 11B for the second option. In these figures, values of $N_{STS}$=10 and $N_{EHT-LTF}$=6 are assumed. Accordingly, in FIG. 11A (for the case of the first option), space-time streams of index 9 and index 10 are multiplexed to each of the EHT-LTF symbols 5 and 6 in the second symbol group. In FIG. 11B (for the case of the second option), STS of index 9 is mapped on data tones of the first tone group of the 5th EHT-LTF symbol and data tones of the second tone group of the 6th EHT-LTF symbol, while STS of index 10 is mapped on data tones of the second tone group of the 5th EHT-LTF symbol and data tones of the first tone group of the 6th EHT-LTF symbol. Advantageously, channel accuracy may be improved for one or two space-time streams in the third stream group since interpolation or extrapolation is unnecessary.

It is also possible to use values of $N_{STS}$ and $N_{EHT-LTF}$ that differ from those presented in the table 500 as shown in FIG. 5. In a third embodiment, the number of EHT-LTF symbols may instead be as follows:

$$N_{EHT-LTF} = \begin{cases} N_{STS}+1, N_{STS}=3,5,7 \\ N_{STS}, N_{STS}=2,4,6,8 \\ 6, 9 \le N_{STS} \le 12 \\ 8, 13 \le N_{STS} \le 16 \end{cases}$$

Figure 12:
FIG. 12 shows a table displaying values of $N_{STS}$ with its corresponding $N_{EHT\text{-}LTF}$ values according to a third embodiment of the present disclosure.

The relationship between the values of the $N_{EHT-LTF}$ and $N_{STS}$ as shown in the above formula can be seen in the table 1200 of FIG. 12. For example, when the $N_{STS}$ is 2, the corresponding $N_{EHT-LTF}$ value is 2; when the $N_{STS}$ is 3 or 4, the corresponding $N_{EHT-LTF}$ value is 4; when the $N_{STS}$ is 5 to 6, the corresponding $N_{EHT-LTF}$ value is 6; when the $N_{STS}$ is 7 to 8, the corresponding $N_{EHT-LTF}$ value is 8; when the $N_{STS}$ is 9 to 12, the corresponding $N_{EHT-LTF}$ value is 6; and when the $N_{STS}$ is 13 to 16, the corresponding $N_{EHT-LTF}$ value is 8. In the third embodiment, for $N_{STS}$=2 to 8 in a single-AP system, the 11ax HE-LTF is reused for 11be EHT-LTF. For $N_{STS}$>8 in a single-AP or multi-AP system, the time-frequency-domain-based method as explained above is used, which is similar to the case when $N_{EHT-LTF}$=6 or 8. Advantageously, there is less specification impact due to no EHT-LTF design optimization for $N_{STS}$=2 to 8.

In the third embodiment, for $N_{STS}$=2 to 8 in a multi-AP system, $N_{STS}$ space-time streams are multiplexed to data tones for each of all EHT-LTF symbols by applying a P matrix. $N_{AP}$ AP-specific pilot streams are multiplexed to pilot tones of all EHT-LTF symbols by applying the P matrix, wherein the pilot stream for the i-th AP corresponds to the i-th row of the P matrix, and wherein the P matrix is $P_{2\times2}$, $P_{4\times4}$, $P_{6\times6}$ or $P_{8\times8}$ when $N_{EHT-LTF}$=2, 4, 6 or 8.

In a fourth embodiment, the number of EHT-LTF symbols may instead be as follows:

$$N_{EHT-LTF} = \begin{cases} N_{STS}+1, N_{STS}=3,5,7 \\ N_{STS}, N_{STS}=2,4,6,8 \\ 8, 9 \le N_{STS} \le 16 \end{cases}$$

The relationship between the values of the $N_{EHT-LTF}$ and $N_{STS}$ as shown in the above formula can be seen in the table 1300 of FIG. 13. For example, when the $N_{STS}$ is 2, the corresponding $N_{EHT-LTF}$ value is 2; when the $N_{STS}$ is 3 or 4, the corresponding $N_{EHT-LTF}$ value is 4; when the $N_{STS}$ is 5 to 6, the corresponding $N_{EHT-LTF}$ value is 6; when the $N_{STS}$ is 7 to 8, the corresponding $N_{EHT-LTF}$ value is 8; and when the $N_{STS}$ is 9 to 16, the corresponding $N_{EHT-LTF}$ value is 8. In the fourth embodiment, for $N_{STS}$=2 to 8 in a single-AP system, the 11ax HE-LTF is reused for 11be EHT-LTF. For $N_{STS}$>8 in a single-AP or multi-AP system, the time-frequency-domain-based method as explained above is used, which is similar to the case when $N_{EHT-LTF}$=8. Advantageously, channel estimation accuracy may be better for $N_{STS}$=9 to 12.

In the fourth embodiment, for $N_{STS}$=2 to 8 in a multi-AP system, $N_{STS}$ space-time streams are multiplexed to data tones for each of all EHT-LTF symbols by applying a P matrix. $N_{AP}$ AP-specific pilot streams are multiplexed to pilot tones of all EHT-LTF symbols by applying the P matrix, wherein the pilot stream for the i-th AP corresponds to the i-th row of the P matrix, and wherein the P matrix is $P_{2\times2}$, $P_{4\times4}$, $P_{6\times6}$ or $P_{8\times8}$ when $N_{EHT-LTF}$=2, 4, 6 or 8.

Figure 14:
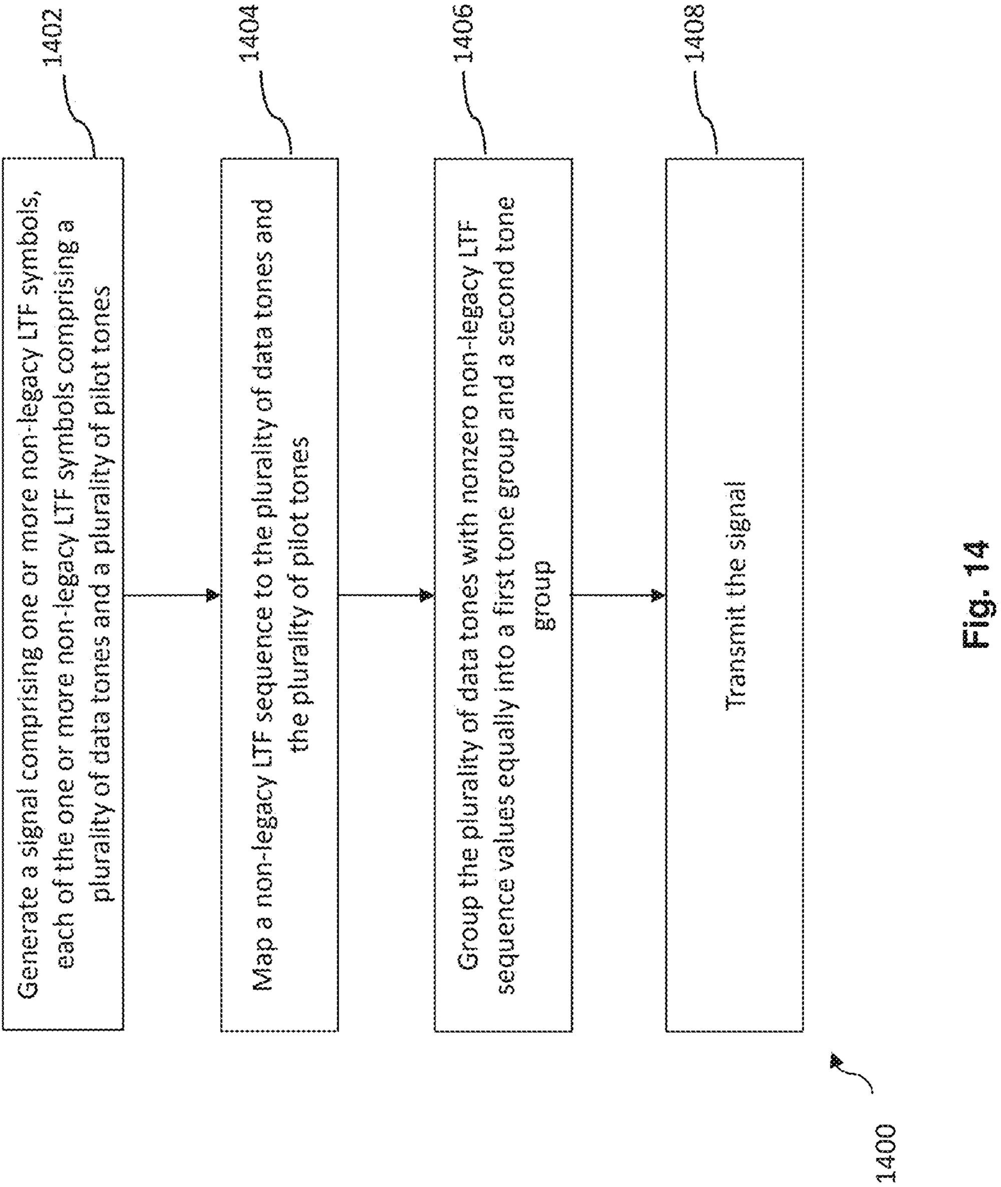
FIG. 14 shows a flow diagram illustrating a communication method in accordance with various embodiments of the present disclosure.

FIG. 14 shows a flow diagram 1400 illustrating a communication method according to various embodiments. In step 1402, a signal comprising one or more non-legacy LTF (e.g. EHT-LTF) symbols is generated, each of the one or more non-legacy LTF symbols comprising a plurality of data tones and a plurality of pilot tones. In step 1404, a non-legacy LTF sequence is mapped to the plurality of data tones and the plurality of pilot tones. In step 1406, the plurality of data tones with nonzero non-legacy LTF sequence values are grouped equally into a first tone group and a second tone group. In step 1408, the signal is transmitted.

Figure 15:
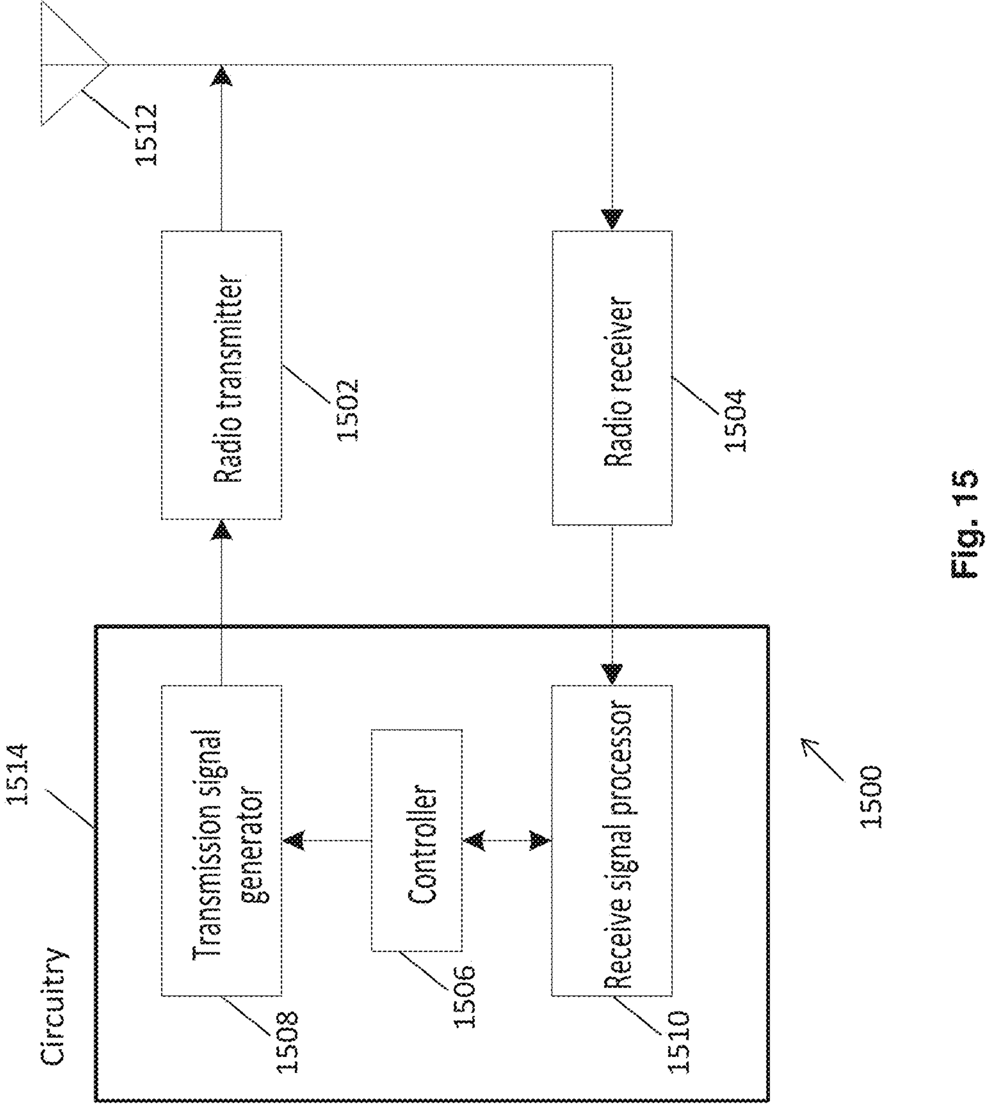
FIG. 15 shows a schematic example of communication apparatus in accordance with embodiments. The communication apparatus may be implemented as an AP or a STA and configured for channel estimation in accordance with various embodiments of the present disclosure.

FIG. 15 shows a schematic, partially sectioned view of the communication apparatus 1500 that can be implemented for channel estimation in accordance with various embodiments as shown in FIGS. 1 to 22. The communication apparatus 1500 may be implemented as an AP or STA according to various embodiments.

Various functions and operations of the communication apparatus 1500 are arranged into layers in accordance with a hierarchical model. In the model, lower layers report to higher layers and receive instructions therefrom in accordance with IEEE specifications. For the sake of simplicity, details of the hierarchical model are not discussed in the present disclosure.

As shown in FIG. 15, the communication apparatus 1500 may include circuitry 1514, at least one radio transmitter 1502, at least one radio receiver 1504 and multiple antennas 1512 (for the sake of simplicity, only one antenna is depicted in FIG. 15 for illustration purposes). The circuitry may include at least one controller 1506 for use in software and hardware aided execution of tasks it is designed to perform, including control of communications with one or more other communication apparatuses in a MIMO wireless network. The at least one controller 1506 may control at least one transmission signal generator 1508 for generating PPDUs to be sent through the at least one radio transmitter 1502 to one or more other communication apparatuses and at least one receive signal processor 1510 for processing PPDUs received through the at least one radio receiver 1504 from the one or more other communication apparatuses. The at least one transmission signal generator 1508 and the at least one receive signal processor 1510 may be stand-alone modules of the communication apparatus 1500 that communicate with the at least one controller 1506 for the above-mentioned functions, as shown in FIG. 15. Alternatively, the at least one transmission signal generator 1508 and the at least one receive signal processor 1510 may be included in the at least one controller 1506. It is appreciable to those skilled in the art that the arrangement of these functional modules is flexible and may vary depending on the practical needs and/or requirements. The data processing, storage and other relevant control apparatus can be provided on an appropriate circuit board and/or in chipsets. In various embodiments, when in operation, the at least one radio transmitter 1502, at least one radio receiver 1504, and at least one antenna 1512 may be controlled by the at least one controller 1506.

As shown in FIG. 15, the at least one radio receiver 1504, together with the at least one receive signal processor 1510, forms a receiver of the communication apparatus 1500. The receiver of the communication apparatus 1500, when in operation, provides functions required for channel estimation.

The at least one radio transmitter 1502, in operation, may transmit a PPDU to one or more other communication apparatus in a MIMO wireless network. The PPDU includes a non-legacy LTF (e.g. EHT-LTF) that facilitates the one or more other communication apparatus to estimate respective channels for respective communications with the communication apparatus.

For example, in a downlink SU communication, the communication apparatus 1500 is an AP, the one or more other communication apparatus in the MIMO wireless network is a STA. In operation, the at least one radio transmitter 1502 of the AP 1500 transmits the PPDU in the format of a SU PPDU to the receiver of the STA.

Likewise, in an uplink SU communication, the communication apparatus 1500 is a STA, the one or more other communication apparatus in the MIMO wireless network is an AP. In operation, the at least one radio transmitter 1502 of the STA 1500 transmits the PPDU in the format of a SU PPDU to the receiver of the AP.

In a downlink MU communication, the communication apparatus 1500 is an AP, the one or more other communication apparatus in the MIMO wireless network include multiple STAs. In operation, the at least one radio transmitter 1502 of the AP 1500 transmits the PPDU in the format of a MU PPDU to the receiver of each of the multiple STAs.

In a trigger-based uplink MU communication, the communication apparatus 1500 is a STA, the one or more other communication apparatus in the MIMO wireless network is an AP. In operation, the at least one radio transmitter 1502 of the STA 1500 transmits the PPDU in the format of a TB PPDU to the receiver of the AP.

In a trigger-based downlink multi-AP communication, the communication apparatus 1500 is one of a plurality of APs. The one or more other communication apparatus in the MIMO wireless network include multiple STAs. In operation, the at least one radio transmitter 1502 of the one of the plurality of APs 1500 transmits the PPDU in the format of a JT PPDU to the receivers of the multiple STAs.

In the SU PPDU, MU PPDU, TB PPDU or JT PPDU, the EHT-LTF comprises a plurality of EHT-LTF symbols for the receiver of the one or more other communication apparatus to estimate respective channels for respective communications with the transmitter of the communication apparatus in SU, MU or multi-AP communications.

In the present disclosure, the at least one controller 1506 of the communication apparatus 1500 establishes the number of EHT-LTF symbols ($N_{EHT-LTF}$) for generating the EHT-LTF in the PPDU.

In some examples, in downlink SU communications and downlink MU communications, the at least one controller 1506 of the AP 1500 determines the $N_{EHT-LTF}$ When establishing the $N_{EHT-LTF}$ for generating a SU PPDU or a MU PPDU. In uplink SU communications, the at least one controller 1506 of the STA 1500 determines the $N_{EHT-LTF}$ when establishing the $N_{EHT-LTF}$ for generating a SU PPDU.

In some other examples, in trigger-based uplink MU communications, the $N_{EHT-LTF}$ is determined by the at least one controller of an AP and included into trigger information as described above. When the STA 1500 receives the trigger information from the AP, the at least one controller 1506 of the STA 1500 establishes the $N_{EHT-LTF}$ by retrieving the $N_{EHT-LTF}$ from the trigger information and generates a TB PPDU.

In some other examples, in trigger-based downlink multi-AP communications, the $N_{EHT-LTF}$ is determined by the at least one controller of a master AP and included into trigger information as described above. When the slave AP 1500 receives the trigger information from the master AP, the at least one controller 1506 of the slave AP 1500 establishes the $N_{EHT-LTF}$ by retrieving the $N_{EHT-LTF}$ from the trigger information and generates a JT PPDU.

The communication apparatus 1500, when in operation, provides functions required for facilitating channel estimation. For example, the communication apparatus 1500 may be an AP, and the circuitry 1514 may, in operation, generates a signal comprising one or more non-legacy LTF (e.g. EHT-LTF) symbols, each of the one or more non-legacy LTF symbols comprising a plurality of data tones and a plurality of pilot tones, maps a non-legacy LTF sequence to the plurality of data tones and the plurality of pilot tones, and groups the plurality of data tones with nonzero non-legacy LTF sequence values into a first tone group and a second tone group. The transmitter 1502 may, in operation, transmit the generated signal.

The circuitry 1514 may be further configured to generate the signal such that the signal comprises information on a number $N_{STS}$ of space-time streams, wherein a total number of the one or more non-legacy LTF symbols is $\lceil N_{STS}/2 \rceil$ when the $N_{STS}$ is 2, 3, 4, 7, 8, 11, 12, 15 or 16; and $\lceil N_{STS}/2 \rceil+1$ when the $N_{STS}$ is 5, 6, 9, 10, 13 or 14.

The circuitry 1514 may be further configured to generate the signal such that the signal comprises information on a number $N_{STS}$ of space-time streams, wherein a total number of the one or more non-legacy LTF symbols is $[N_{STS}+1]$ when the $N_{STS}$ is 3, 5, or 7; $N_{STS}$ when $N_{STS}$ is 2, 4, 6 or 8; 6 when $9 \le N_{STS} \le 12$; and 8 when $13 \le N_{STS} \le 16$.

The circuitry 1514 may be further configured to generate the signal such that the signal comprises information on a number $N_{STS}$ of space-time streams, wherein a total number of the one or more non-legacy LTF symbols is $[N_{STS}+1]$ when the $N_{STS}$ is 3, 5, or 7; $N_{STS}$ when $N_{STS}$ is 2, 4, 6 or 8; and 8 when $9 \le N_{STS} \le 16$.

The circuitry 1514 may be further configured to group the plurality of data tones such that the first tone group comprises every second data tones with nonzero non-legacy LTF sequence values starting with a first data tone with nonzero non-legacy LTF sequence value; while the second tone group comprises every second data tones with nonzero non-legacy LTF sequence values starting with a second data tone with nonzero non-legacy LTF sequence value.

The circuitry 1514 may be further configured to group two or more space-time streams into a first stream group and a second stream group; apply a $P_1$ matrix to multiplex one or more space-time streams in the first stream group to data tones in the first tone group for each of the one or more non-legacy LTF symbols; and apply a $P_2$ matrix to multiplex one or more space-time streams in the second stream group to data tones in the second data tone group for each of the one or more non-legacy LTF symbols. The $P_1$ matrix is $P_{2\times2}$, $P_{4\times4}$, $P_{6\times6}$ or $P_{8\times8}$ when a total number of the one or more non-legacy LTF symbols is 2, 4, 6 or 8 respectively, and wherein the $P_2$ matrix is a permutation of the $P_1$ matrix. The first stream group comprises one or more odd indexed space-time streams among the two or more space-time streams; while the second stream group comprises one or more even indexed space-time streams among the two or more space-time streams.

The circuitry 1514 may be further configured to generate the signal such that the signal comprises information on a number of space-time streams used for channel sounding, wherein the signal is a sounding NDP.

The circuitry 1514 may be further configured to generate the signal such that the signal comprises information on a number of space-time streams used for transmission of a PSDU, wherein the signal is a SU PPDU.

The circuitry 1514 may be further configured to generate the signal such that the signal comprises information on a number of the one or more non-legacy LTF symbols, and a number of space-time streams and starting STS number used for transmission of a PSDU of each intended STA, and wherein the signal is a MU PPDU.

The receiver comprising the receive signal processor 1510 and the radio receiver 1504 may, in operation, receive a trigger frame for soliciting a transmission of the signal, wherein the trigger frame comprises information on a number of the one or more non-legacy LTF symbols, and a number of space-time streams and starting STS number used for transmission of a PSDU of the communication apparatus, and wherein the signal is a TB PPDU or a JT PPDU.

It is understandable that the above steps 1402, 1404, 1406 and 1408 of flow diagram 1400 in FIG. 14 may be performed by a same component or different components of the communication apparatus 1500. For example, the above steps 1402, 1404, 1406 and 1408 may be performed by a controller of the communication apparatus, a transmission signal processor of the communication apparatus or any other component of the communication apparatus which is deemed suitable in practice.

As described above, the embodiments of the present disclosure provide an advanced communication system, communication methods and communication apparatuses that enables channel estimation in both single-user communications and multiuser communications in MIMO WLAN networks of an extremely high throughput and improves physical layer throughput in MIMO WLAN networks.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

It will be understood that while some properties of the various embodiments have been described with reference to a device, corresponding properties also apply to the methods of various embodiments, and vice versa.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects illustrative and not restrictive.

The invention claimed is:

1. An integrated circuit, which comprises circuitry configured to:

generate a signal comprising one or more non-legacy long training field (LTF) symbols, each of the one or more non-legacy LTF symbols comprising a plurality of data tones and a plurality of pilot tones;

map a non-legacy LTF sequence to the plurality of data tones and the plurality of pilot tones;

group the plurality of data tones with nonzero non-legacy LTF sequence values into a first tone group and a second tone group; and transmit the generated signal, wherein the circuitry is configured to generate the signal such that the signal comprises information on a number $N_{STS}$ of space-time streams, wherein a total number of the one or more non-legacy LTF symbols is $\lceil N_{STS}/2 \rceil$ when the $N_{STS}$ is 2, 3, 4, 7, 8, 11, 12, 15 or 16; and $\lceil N_{STS}/2 \rceil+1$ when the $N_{STS}$ is 5, 6, 9, 10, 13 or 14.

2. The integrated circuit according to claim 1, comprising:

at least one input coupled to the circuitry, wherein the at least one input, in operation, inputs data; and at least one output coupled to the circuitry, wherein the at least one output, in operation, outputs data to be transmitted.

3. The integrated circuit according to claim 1, wherein the circuitry comprises:

processing circuitry, which, in operation, controls the generating, the mapping and the grouping; and transmission circuitry, which, in operation, controls the transmitting of the generated signal.

4. The integrated circuit according to claim 1, wherein the circuitry, in operation:

groups two or more space-time streams into a first stream group and a second stream group;

applies a $P_1$ matrix to multiplex one or more space-time streams in the first stream group to data tones in the first tone group for each of the one or more non-legacy LTF symbols; and applies a $P_2$ matrix to multiplex one or more space-time streams in the second stream group to data tones in the second tone group for each of the one or more non-legacy LTF symbols.

5. The integrated circuit according to claim 4, wherein the $P_1$ matrix is $P_{2\times2}$, $P_{4\times4}$, $P_{6\times6}$ or $P_{8\times8}$ when a total number of the one or more non-legacy LTF symbols is 2, 4, 6 or 8 respectively, and wherein the $P_2$ matrix is a permutation of the $P_1$ matrix.

6. The integrated circuit according to claim 5, wherein the first stream group comprises one or more odd indexed space-time streams among the two or more space-time streams; while the second stream group comprises one or more even indexed space-time streams among the two or more space-time streams.

7. The integrated circuit according to claim 1, wherein the circuitry, in operation, generates the signal such that the signal comprises information on a number of space-time streams used for channel sounding, wherein the signal is a sounding null data packet (NDP).

8. The integrated circuit according to claim 1, wherein the circuitry, in operation, generates the signal such that the signal comprises information on a number of space-time streams used for transmission of a physical layer service data unit (PSDU), wherein the signal is a single-user (SU) physical layer protocol data unit (PPDU).

9. The integrated circuit according to claim 1, wherein the circuitry, in operation, generates the signal such that the signal comprises information on a number of the one or more non-legacy LTF symbols, and a number of space-time streams and starting space-time stream number used for transmission of a PSDU of each intended STA, and wherein the signal is a multi-user (MU) PPDU.

10. The integrated circuit according to claim 1, wherein the circuitry comprises receiving circuitry, which, in operation, receives a trigger frame for soliciting a transmission of the signal, wherein the trigger frame comprises information on a number of the one or more non-legacy LTF symbols, and a number of space-time streams and starting space-time stream number used for transmission of a PSDU of the communication apparatus, and wherein the signal is a trigger-based (TB) PPDU or a joint transmission (JT) PPDU.

11. The integrated circuit according to claim 1, wherein the circuitry, in operation, groups the plurality of data tones such that the first tone group comprises every second data tones with nonzero non-legacy LTF sequence values starting with a first data tone with nonzero non-legacy LTF sequence value, and the second tone group comprises every second data tones with nonzero non-legacy LTF sequence values starting with a second data tone with nonzero non-legacy LTF sequence value.

12. An integrated circuit, which comprises circuitry configured to:

generate a signal comprising one or more non-legacy long training field (LTF) symbols, each of the one or more non-legacy LTF symbols comprising a plurality of data tones and a plurality of pilot tones;

map a non-legacy LTF sequence to the plurality of data tones and the plurality of pilot tones;

group the plurality of data tones with nonzero non-legacy LTF sequence values into a first tone group and a second tone group; and transmit the generated signal, wherein the circuitry is configured to generate the signal such that the signal comprises information on a number $N_{STS}$ of space-time streams, wherein a total number of the one or more non-legacy LTF symbols is $[N_{STS}+1]$ when the $N_{STS}$ is 3, 5, or 7; $N_{STS}$ when $N_{STS}$ is 2, 4, 6 or 8; and 8 when $9 \le N_{STS} \le 16$.

13. The integrated circuit according to claim 12, comprising:

at least one input coupled to the circuitry, wherein the at least one input, in operation, inputs data; and at least one output coupled to the circuitry, wherein the at least one output, in operation, outputs data to be transmitted.

14. The integrated circuit according to claim 12, wherein the circuitry comprises:

processing circuitry, which, in operation, controls the generating, the mapping and the grouping; and transmission circuitry, which, in operation, controls the transmitting of the generated signal.

15. An integrated circuit, which comprises circuitry configured to:

generate a signal comprising one or more non-legacy long training field (LTF) symbols, each of the one or more non-legacy LTF symbols comprising a plurality of data tones and a plurality of pilot tones;

map a non-legacy LTF sequence to the plurality of data tones and the plurality of pilot tones;

group the plurality of data tones with nonzero non-legacy LTF sequence values into a first tone group and a second tone group; and transmit the generated signal, wherein the circuitry is configured to generate the signal such that the signal comprises information on a number $N_{STS}$ of space-time streams, wherein a total number of the one or more non-legacy LTF symbols is $[N_{STS}+1]$ when the $N_{STS}$ is 3, 5, or 7; $N_{STS}$ when $N_{STS}$ is 2, 4, 6 or 8; 6 when $9 \le N_{STS} \le 12$; and 8 when $13 \le N_{STS} \le 16$.

16. The integrated circuit according to claim 15, comprising:

at least one input coupled to the circuitry, wherein the at least one input, in operation, inputs data; and at least one output coupled to the circuitry, wherein the at least one output, in operation, outputs data to be transmitted.

17. The integrated circuit according to claim 15, wherein the circuitry comprises:

processing circuitry, which, in operation, controls the generating, the mapping and the grouping; and transmission circuitry, which, in operation, controls the transmitting of the generated signal.

* * * * *